United States Patent
Cox et al.

(10) Patent No.: US 7,695,561 B2
(45) Date of Patent: *Apr. 13, 2010

(54) ALPHA-TYPE CALCIUM SULFATE HEMIHYDRATE COMPOSITIONS

(75) Inventors: Danny Cox, College Park, GA (US); Robert Bruce, Burlington (CA)

(73) Assignee: G.B. Technologies, LLC, Fairburn, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/965,294

(22) Filed: Dec. 27, 2007

(65) Prior Publication Data

US 2008/0148996 A1    Jun. 26, 2008

Related U.S. Application Data

(60) Division of application No. 11/080,153, filed on Mar. 15, 2005, now Pat. No. 7,335,254, which is a continuation of application No. 10/800,780, filed on Mar. 15, 2004, now Pat. No. 6,964,704.

(60) Provisional application No. 60/456,207, filed on Mar. 20, 2003.

(51) Int. Cl.
*C04B 11/00* (2006.01)

(52) U.S. Cl. .................................. 106/772; 423/555

(58) Field of Classification Search ........... 106/772; 423/555
See application file for complete search history.

(56) References Cited

U.S. PATENT DOCUMENTS

| 5,015,449 A * | 5/1991 | Koslowski .............. 423/172 |
| 5,015,450 A * | 5/1991 | Koslowski .............. 423/172 |
| 6,964,704 B2 * | 11/2005 | Cox et al. .............. 106/772 |
| 7,335,254 B2 * | 2/2008 | Bruce et al. .............. 106/772 |

FOREIGN PATENT DOCUMENTS

DE    3816513 A1    8/1988

OTHER PUBLICATIONS

DE 2049028 (Van Geelan) Apr. 1971 Germany. Abstract only.*
European Search Report, dated Dec. 4, 2008.

* cited by examiner

*Primary Examiner*—Paul Marcantoni
(74) *Attorney, Agent, or Firm*—Thomas, Kayden, Horstemeyer & Risley LLP

(57) ABSTRACT

Disclosed is an improved alpha-type calcium sulfate hemihydrate. Methods of producing an improved powdered calcium sulfate hemihydrate ($CaSO_4 \cdot \frac{1}{2}H_2O$) [alpha-type] compound are disclosed, at least one method including forming calcium sulfate dihydrate ($CaSO_4 \cdot 2H_2O$) into a briquette, calcining the briquette to transform the calcium sulfate dihydrate to calcium sulfate hemihydrate [alpha-type], drying the calcium sulfate hemihydrate [alpha-type] briquette, and optionally grinding the briquette. Also disclosed are methods of producing an improved gypsum plaster including producing the disclosed powdered calcium sulfate hemihydrate [alpha-type] and mixing the powdered calcium sulfate hemihydrate [alpha-type] with water.

11 Claims, 37 Drawing Sheets

PRIOR ART

PRIOR ART

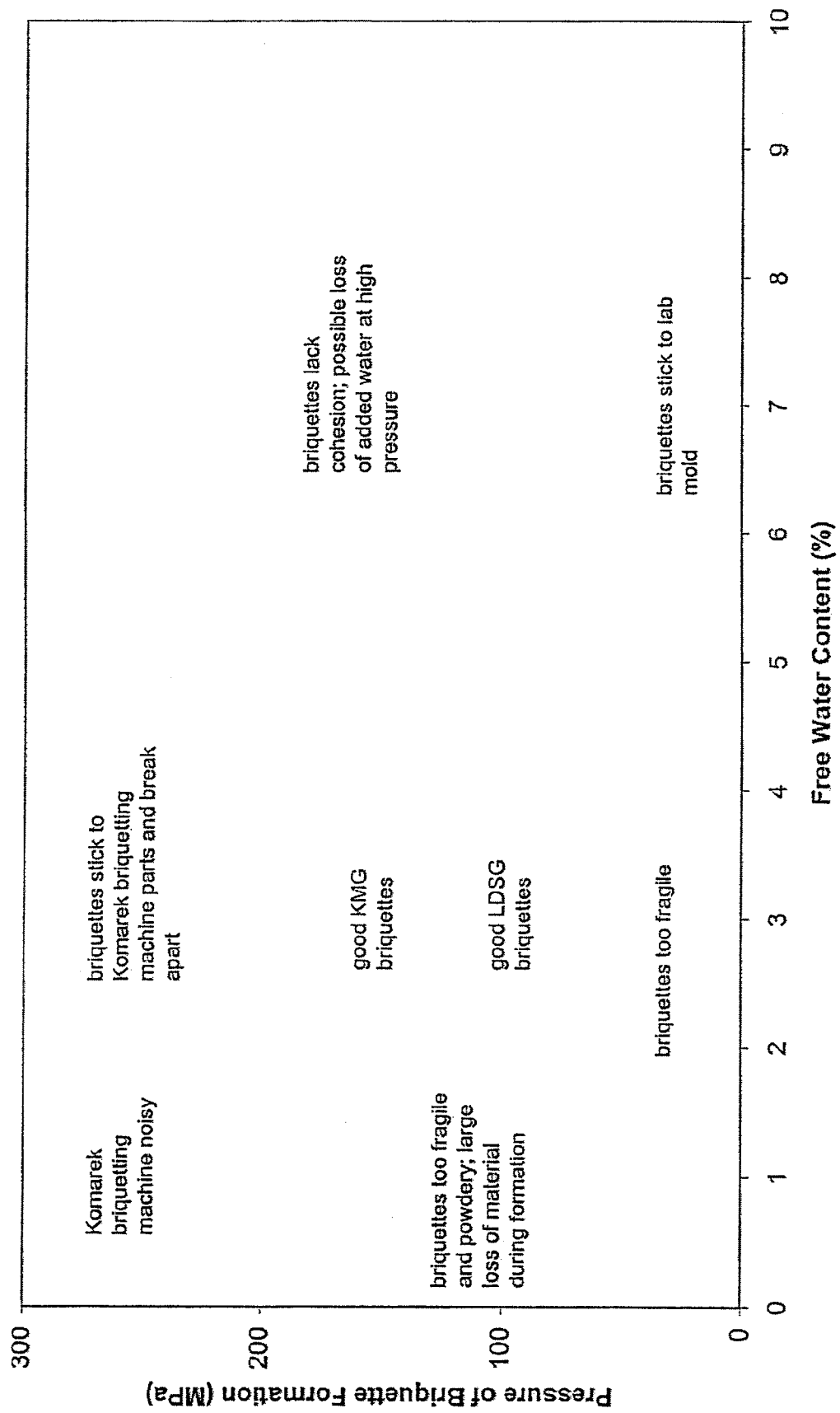
FIG. 4 Quality of Briquettes Schematic

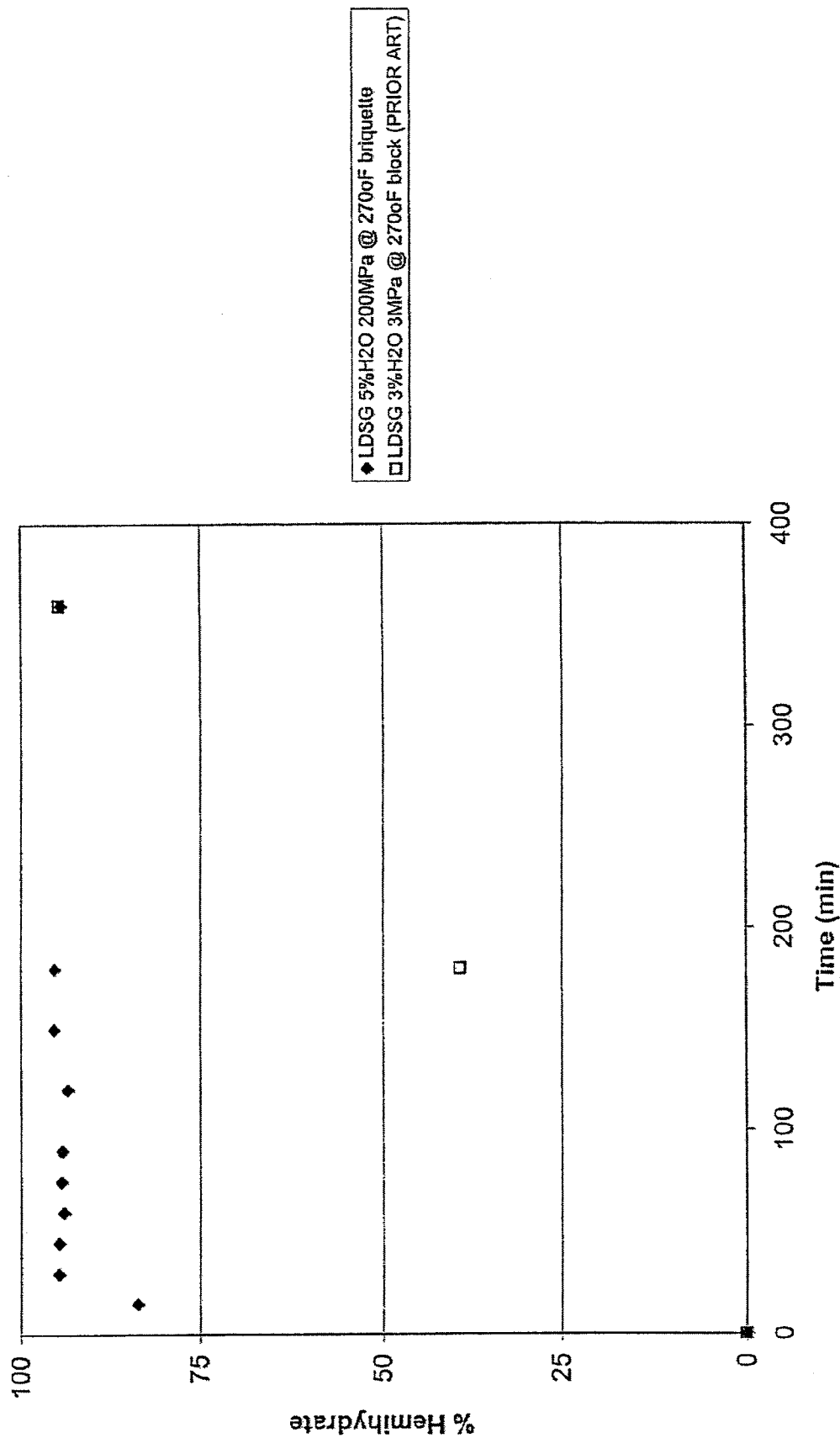

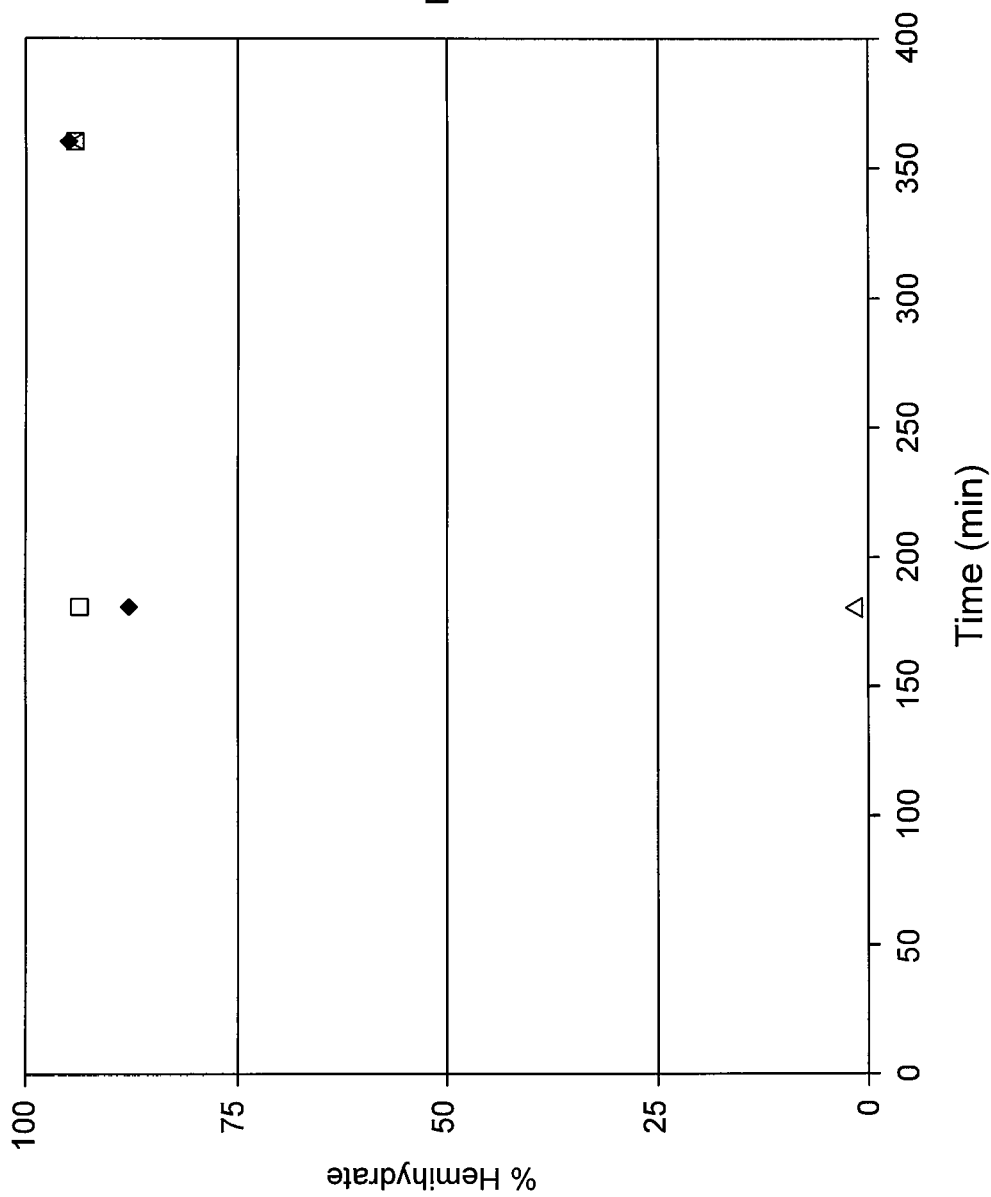
FIG. 6 Rate of Calcination of LDSG 3% $H_2O$ 3 MPa block @ 270°F with Location Sampling (PRIOR ART)

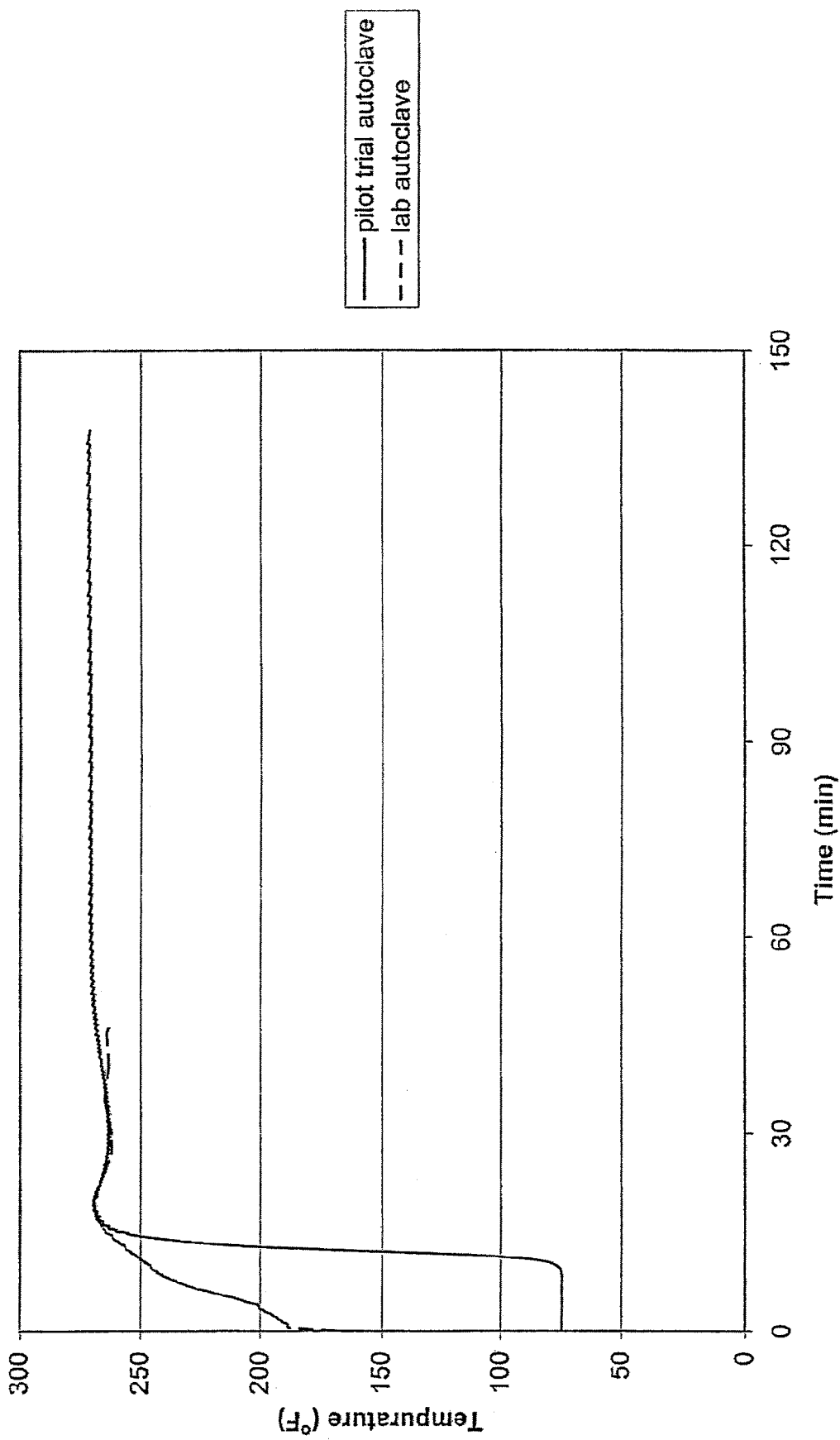
FIG. 8 Autoclave Temperature; Pilot Trial versus Lab Calcination

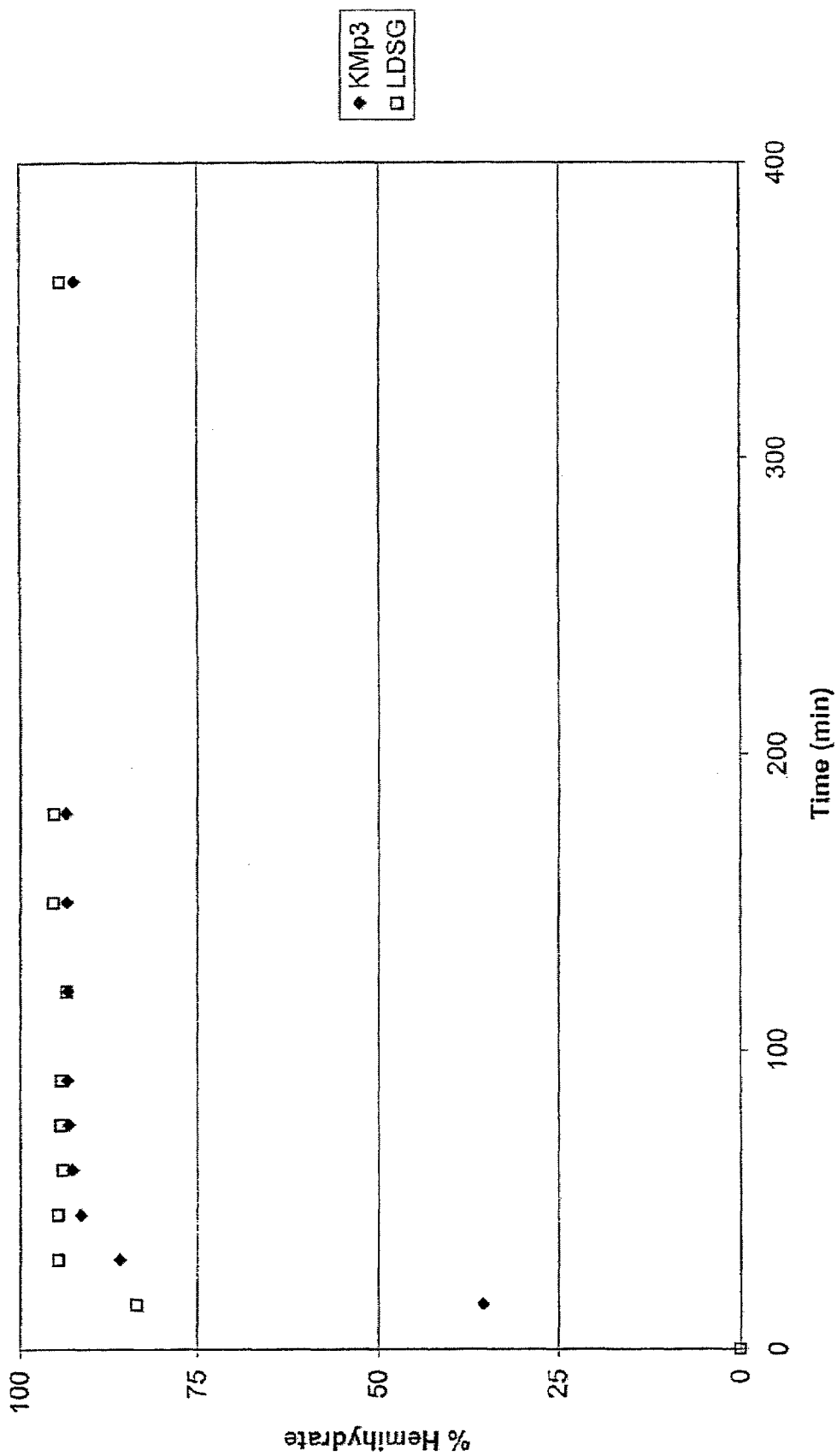
FIG. 9 Rate of Calcination; Gypsum Type 5%H₂O 200MPa @ 270°F

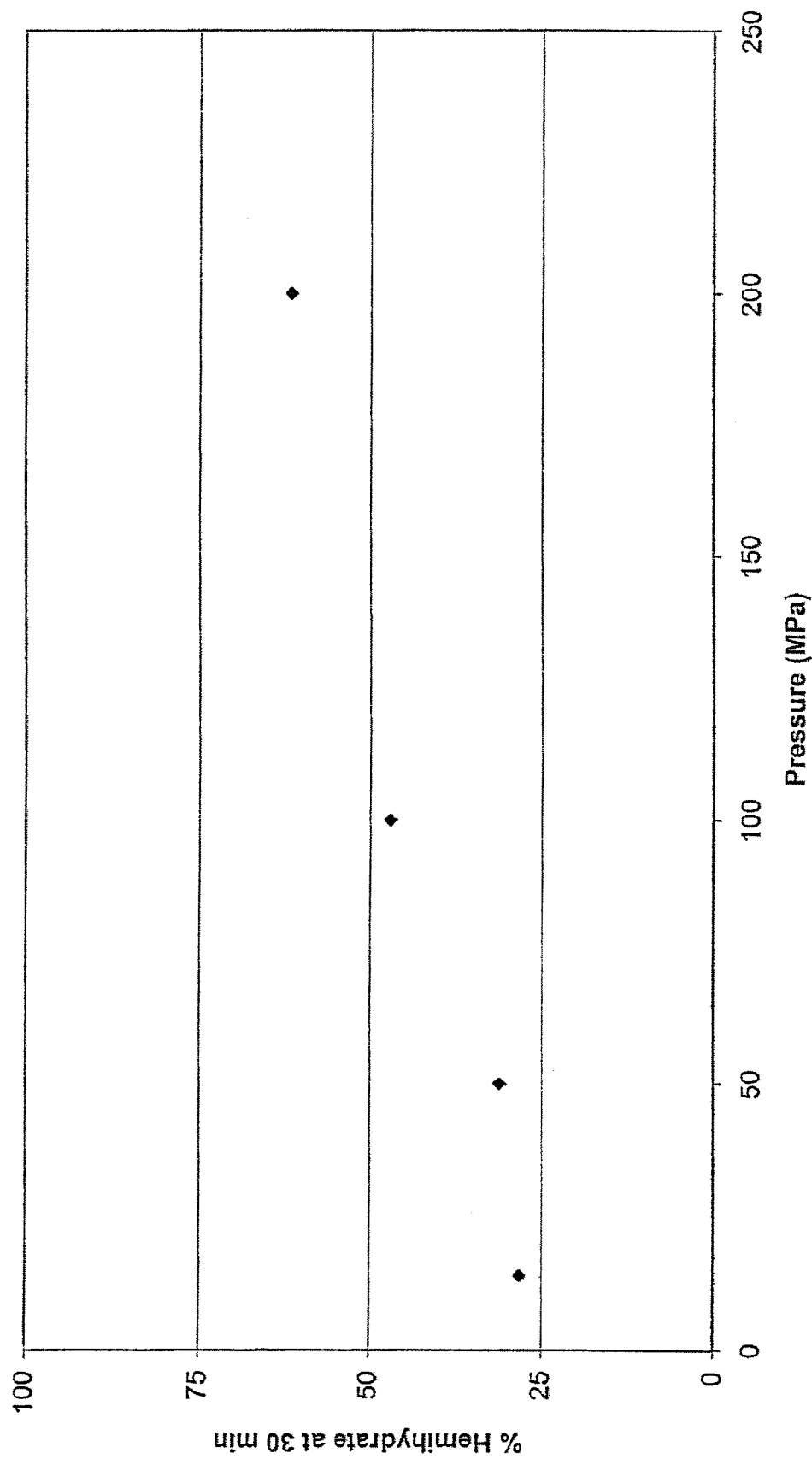
FIG. 10 Rate of Calcination; Effect of Pressure, KMp3 5% H₂O @ 270°C 30 min

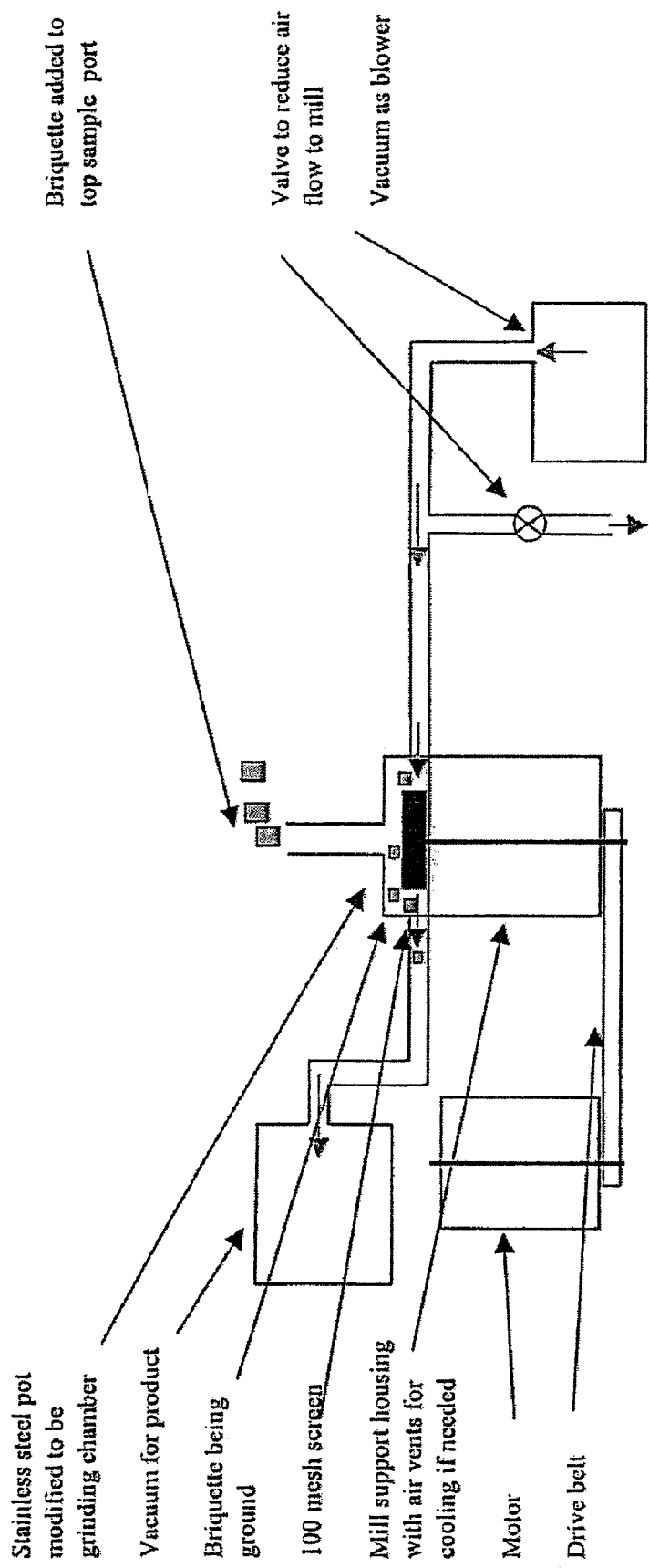
FIG. 11 Hammer Mill Grinding Apparatus

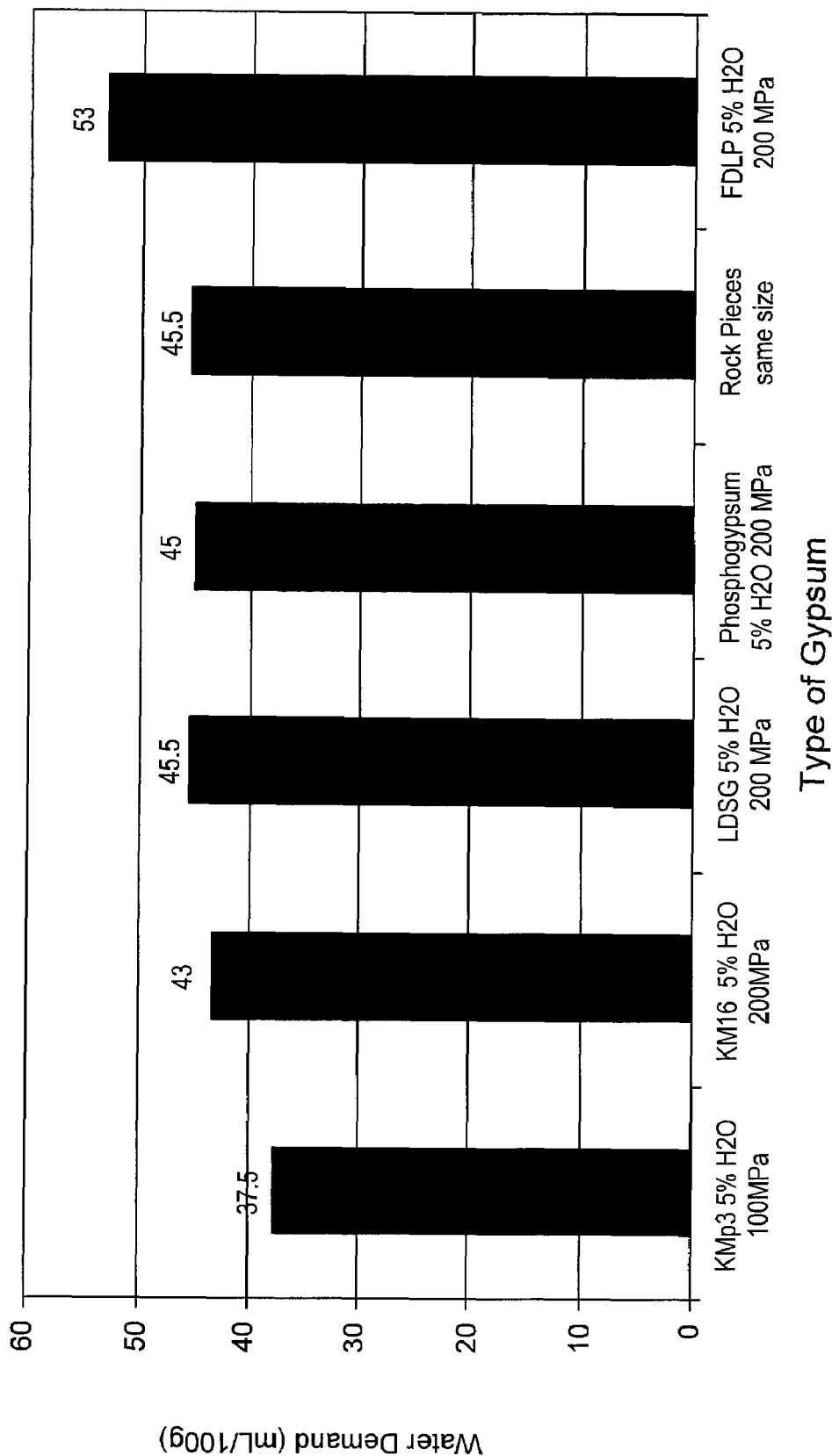
FIG. 12 Water Demand; Type of Gypsum 270°F 150 min

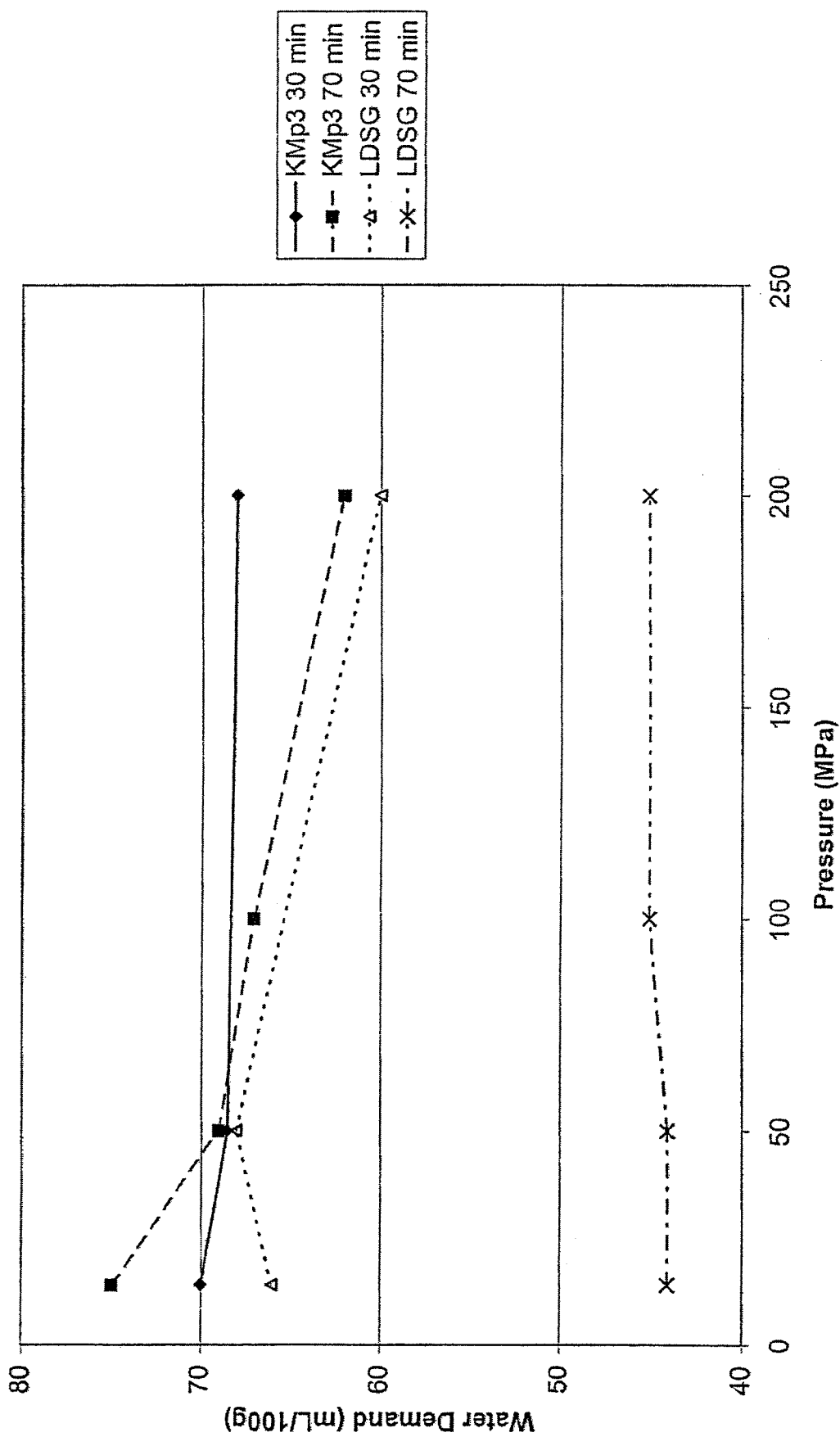
FIG. 13 Water Demand; Effects of Pressure 5% $H_2O$ 270°F

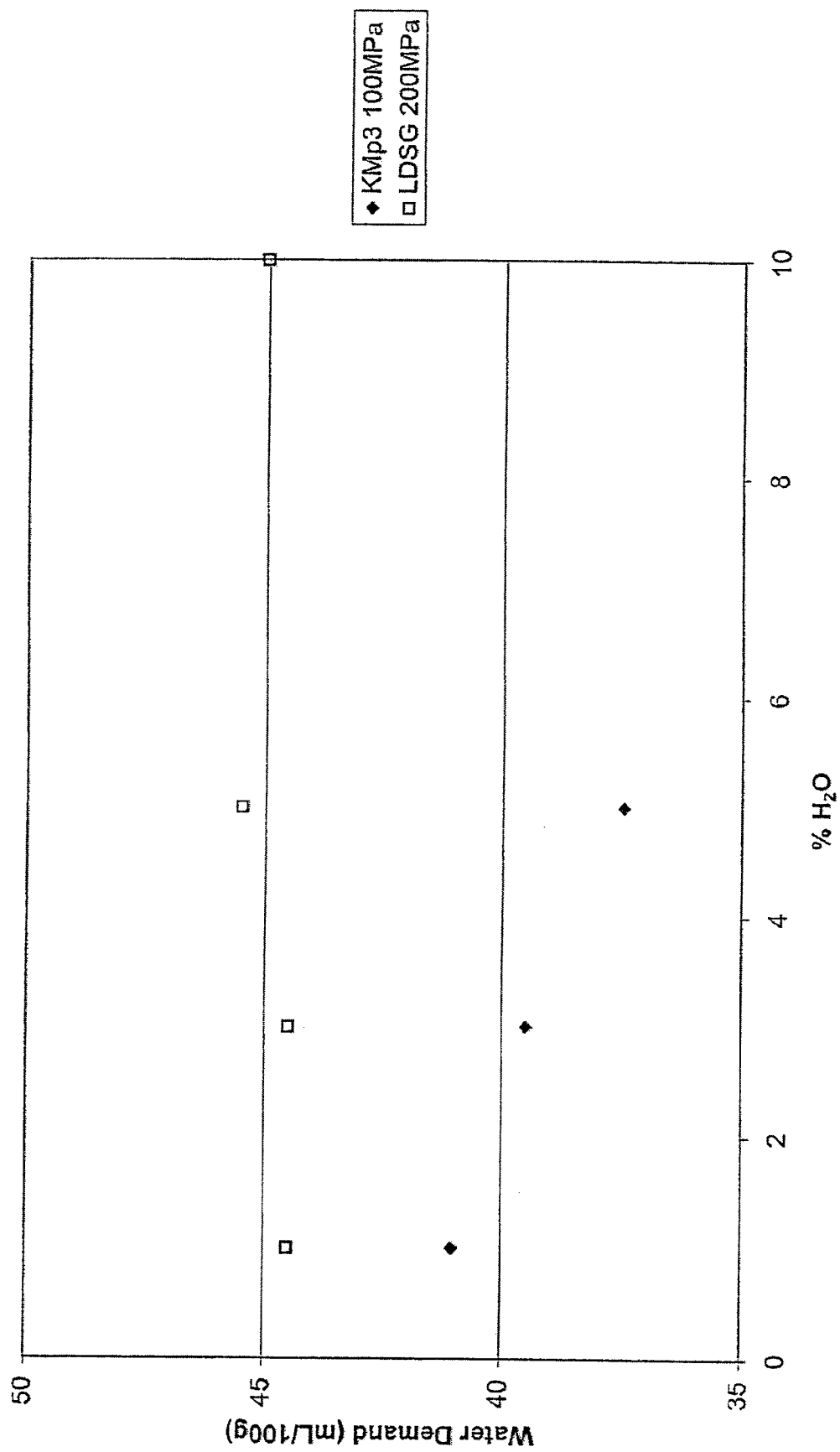
FIG. 15 Water Demand; Effects of $H_2O$ 270°F 150 min

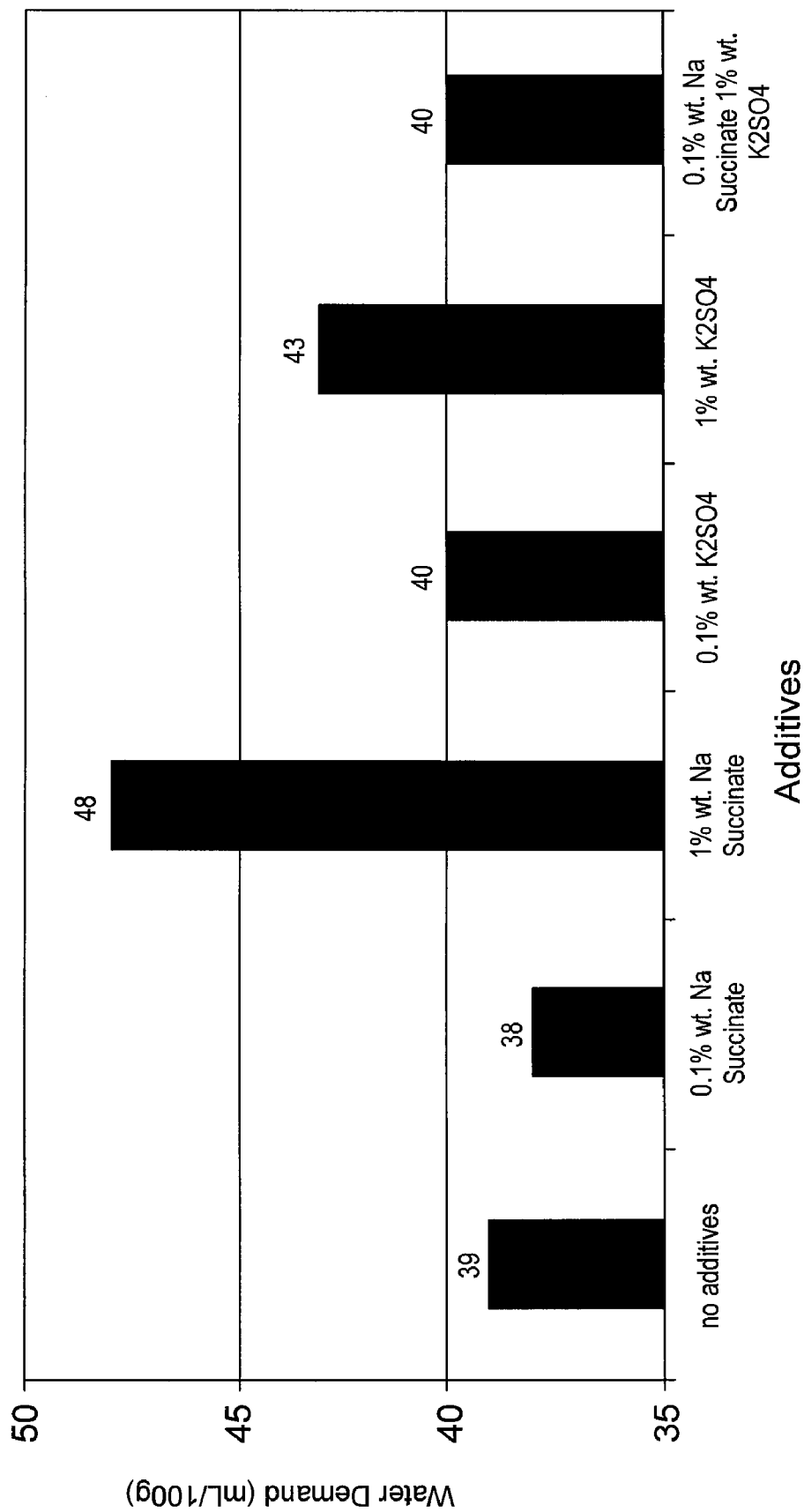
FIG. 16 Water Demand; Effects of Additives KMp3 3% H2O 200 MPa 270°F 150 min

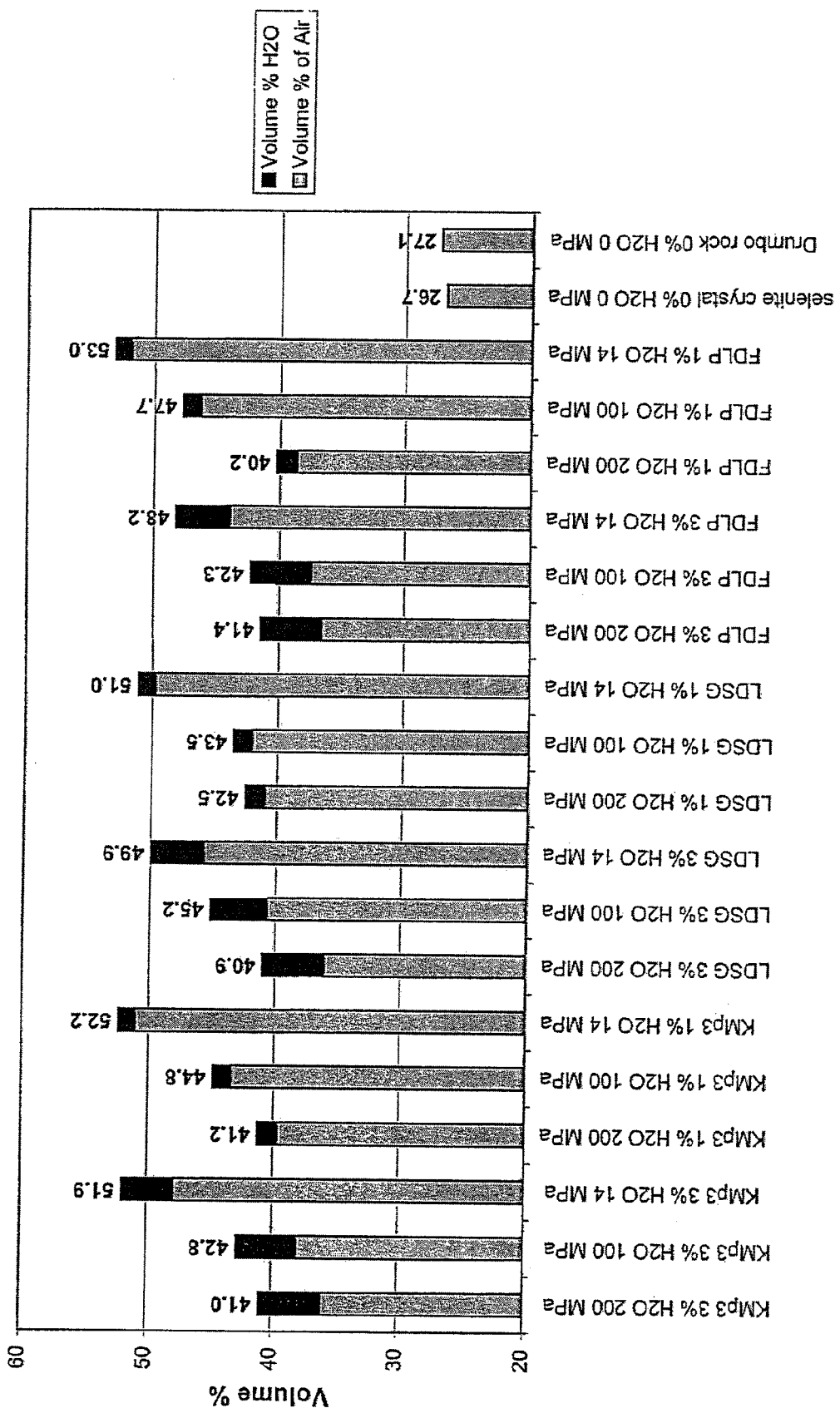
FIG. 17 Briquette Void Percentage; Calcined 150 min @ 270°C

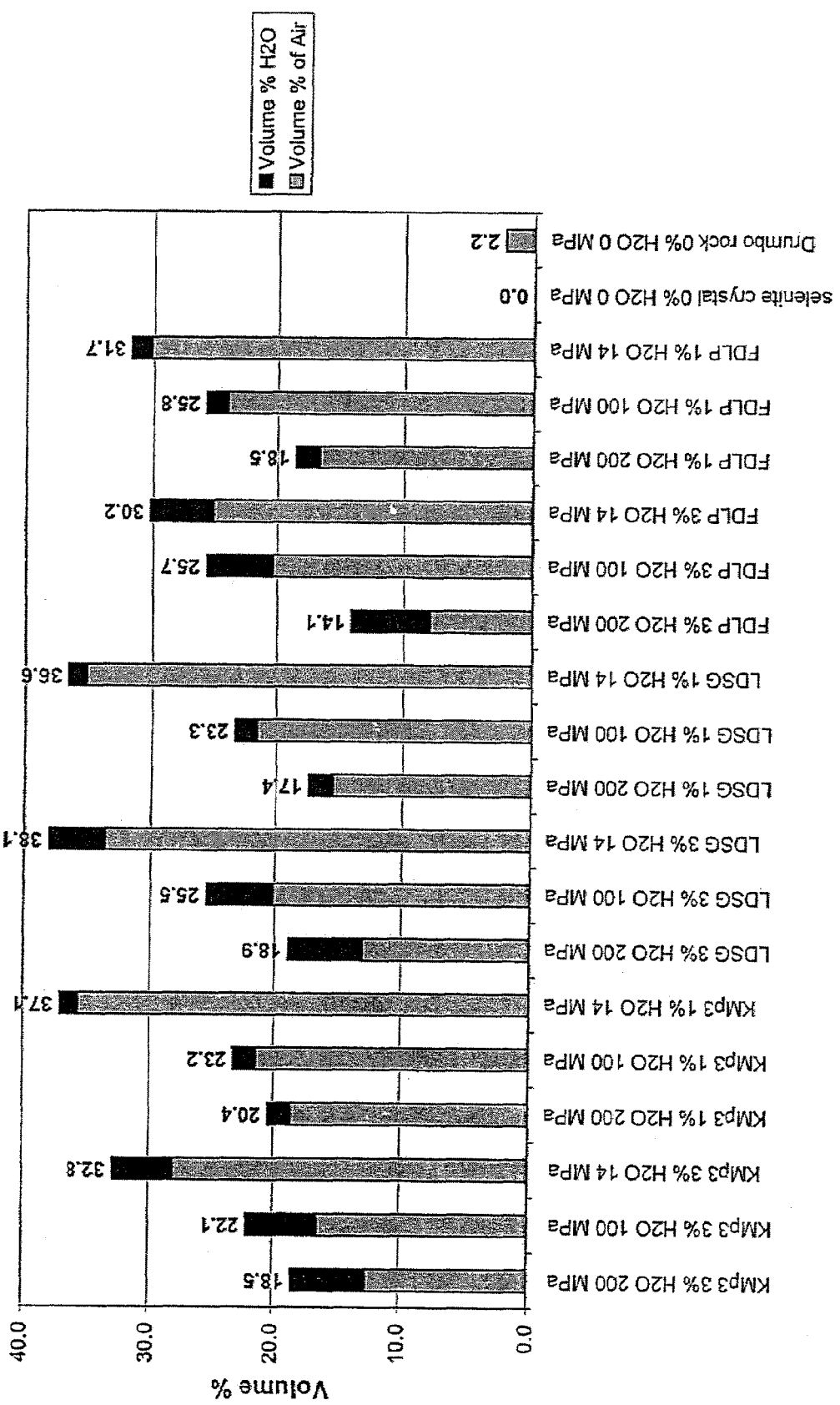
FIG. 18 Briquette Void Percentage; Uncalcined

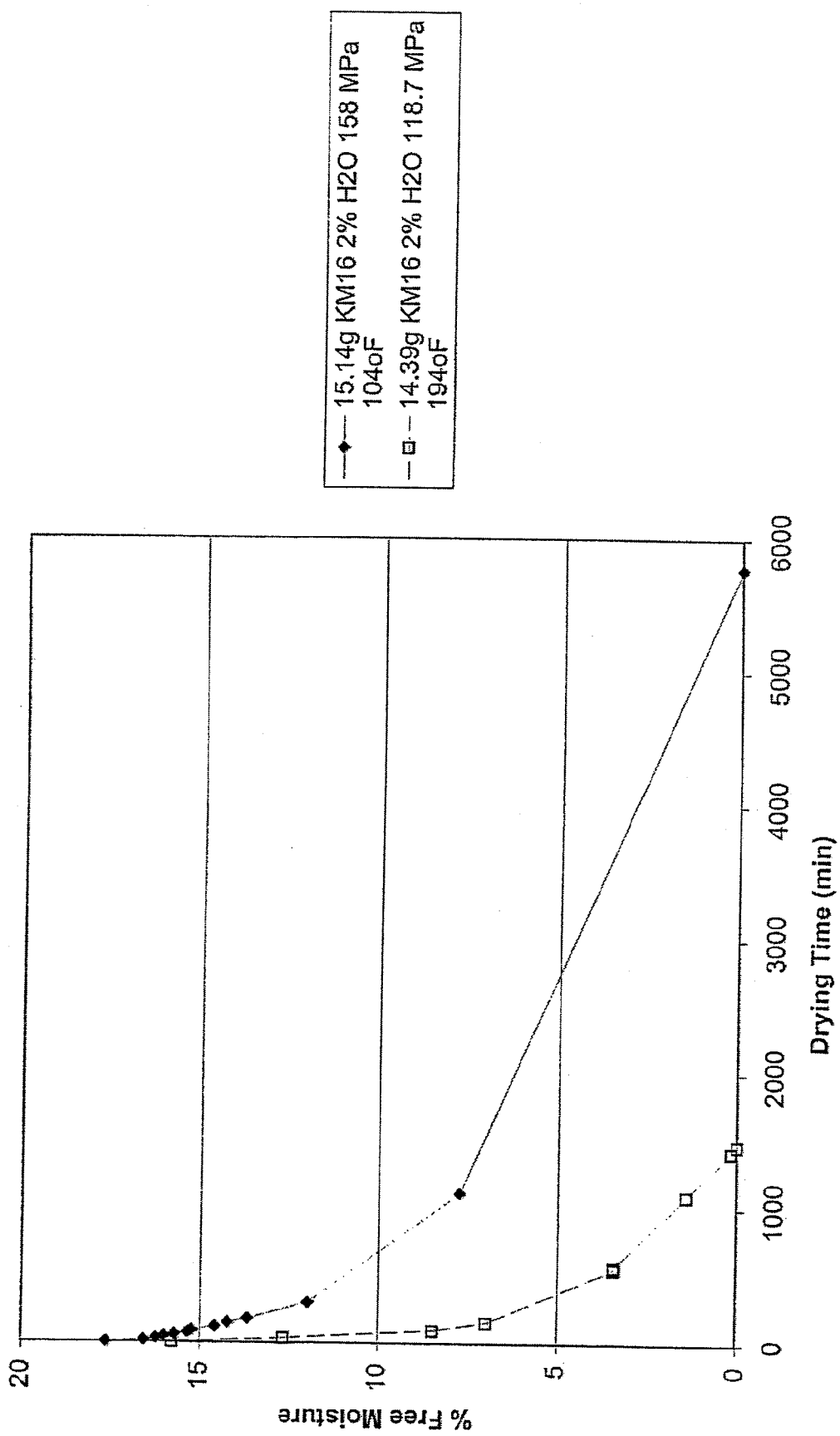
FIG. 19 Drying Rates of Large Briquettes; 104°F versus 194°F

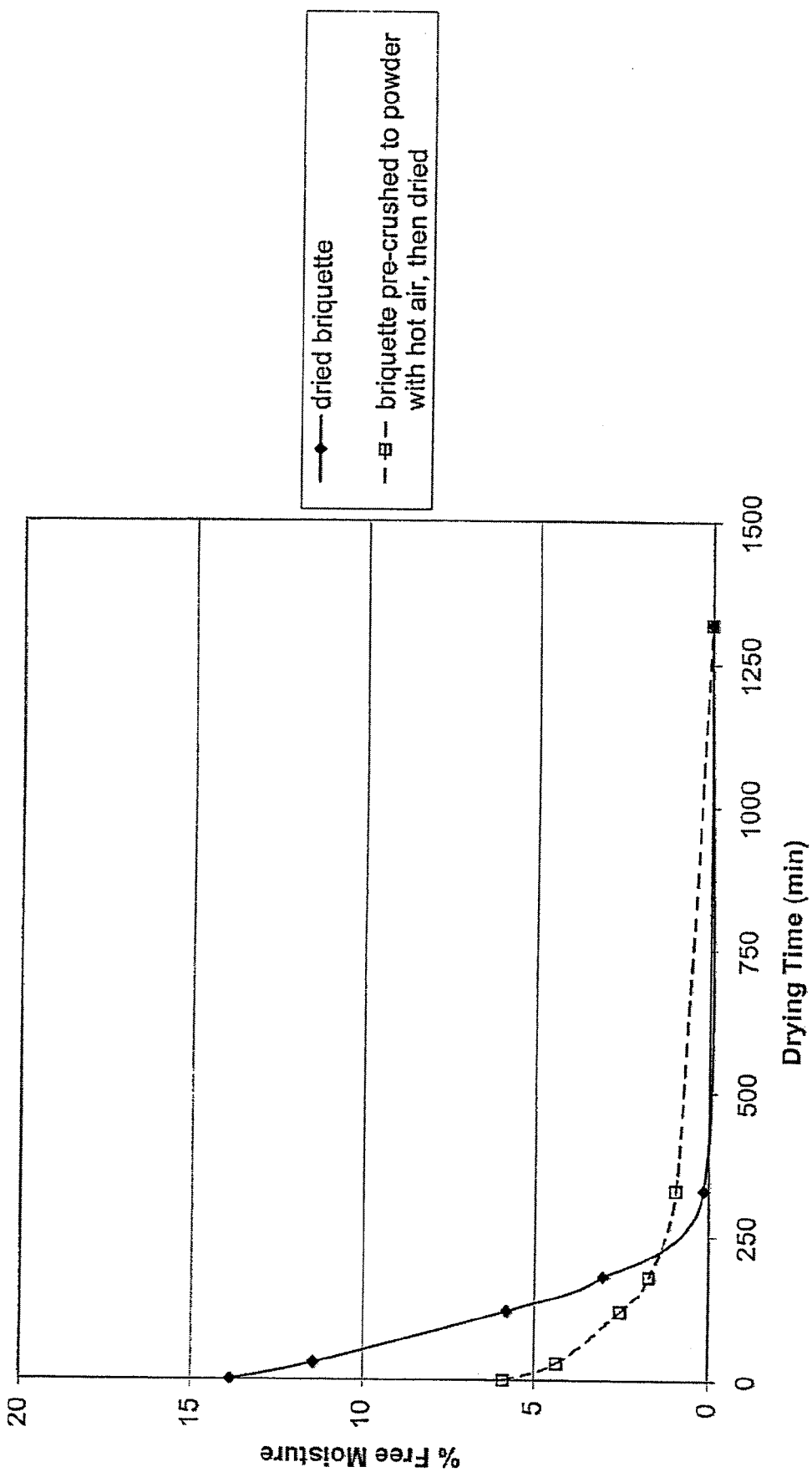
FIG. 20 Drying Rates at 194°F with Varying Drying/Crushing Methods; 18.64g KM16 5% H2O 152 MPa

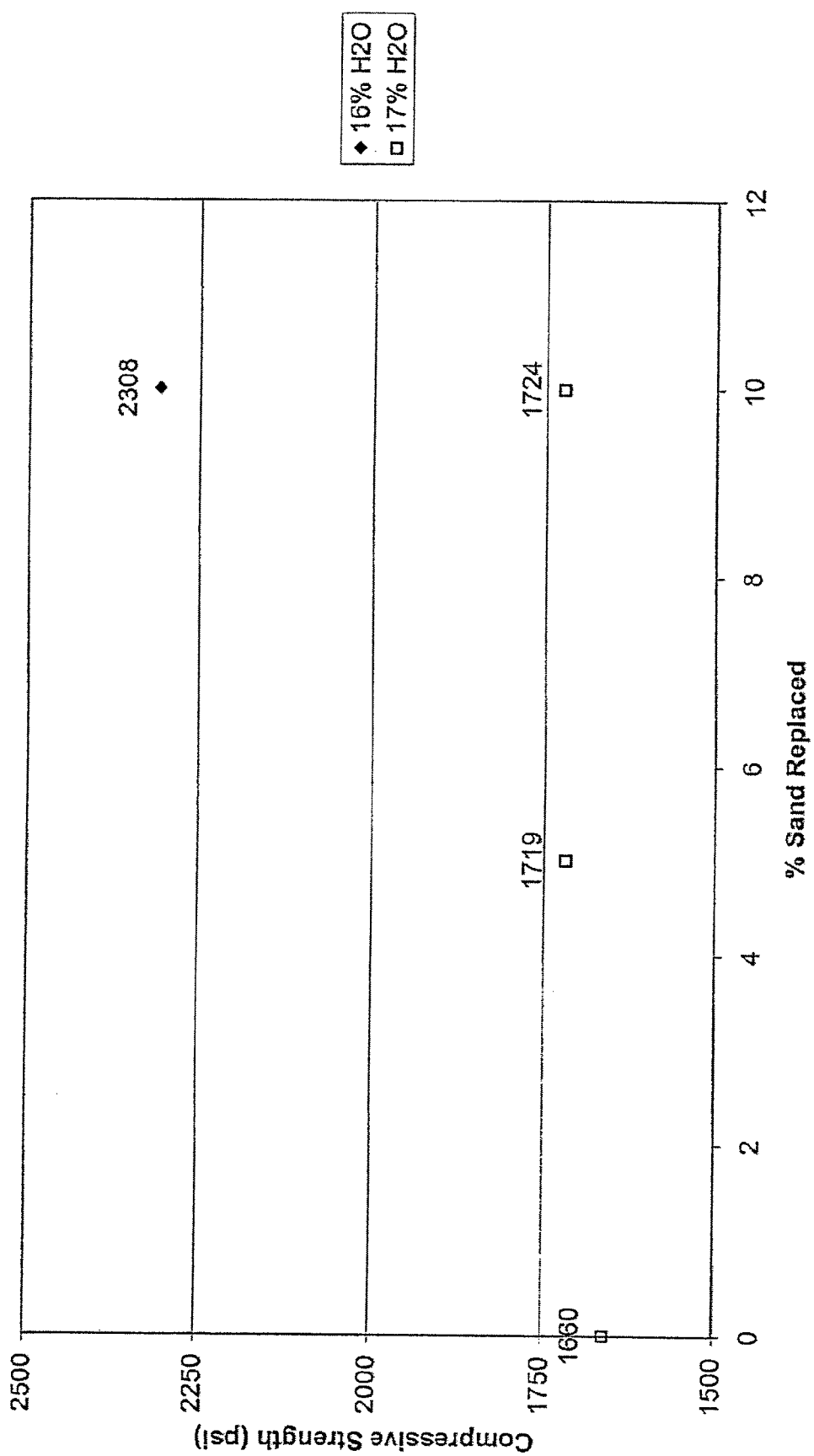

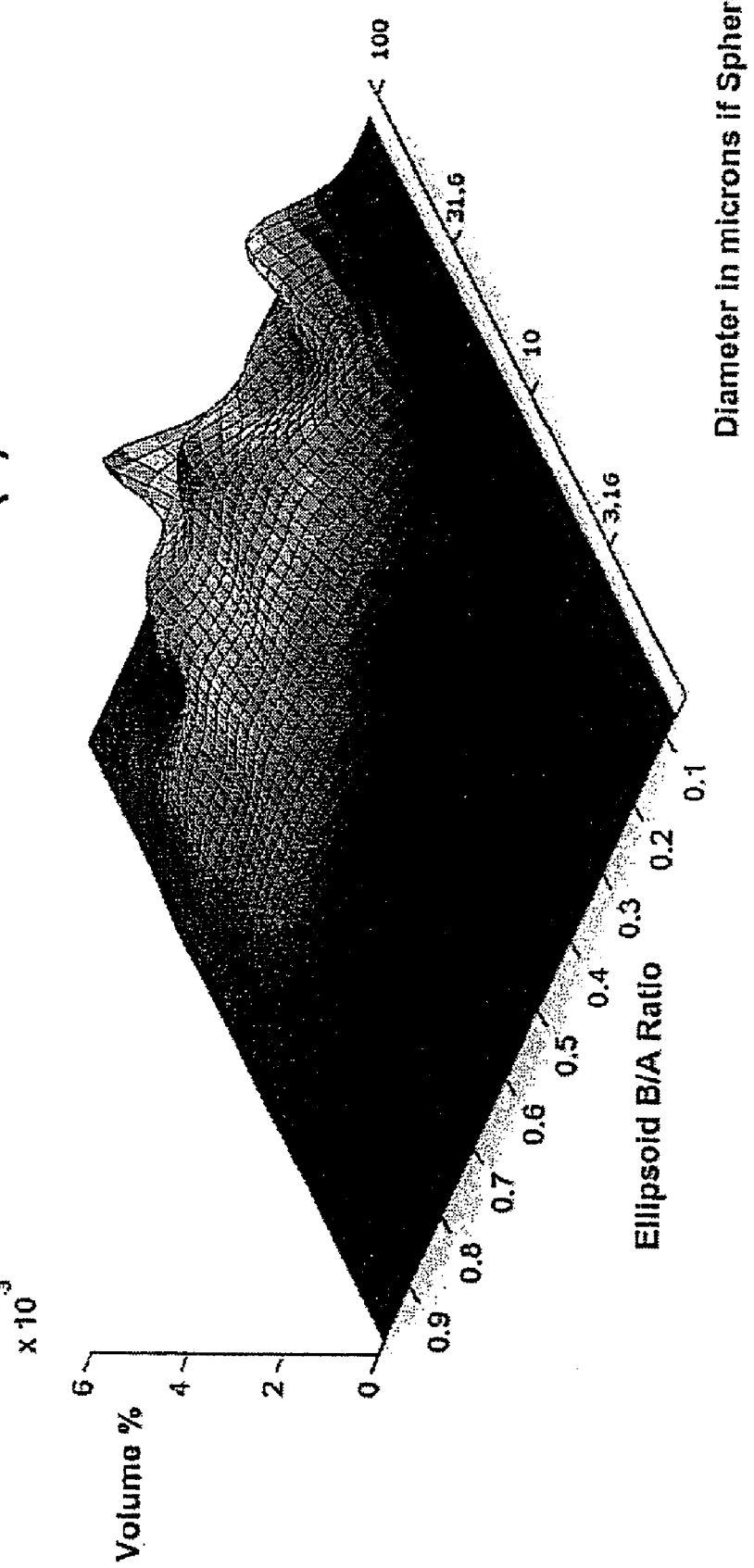
FIG. 22A Raw KMp3
Diameter if Sphere (Log$_{10}$ scale) (X) versus Ellipsoid (B/A) (Y) versus % of Volume (Z)

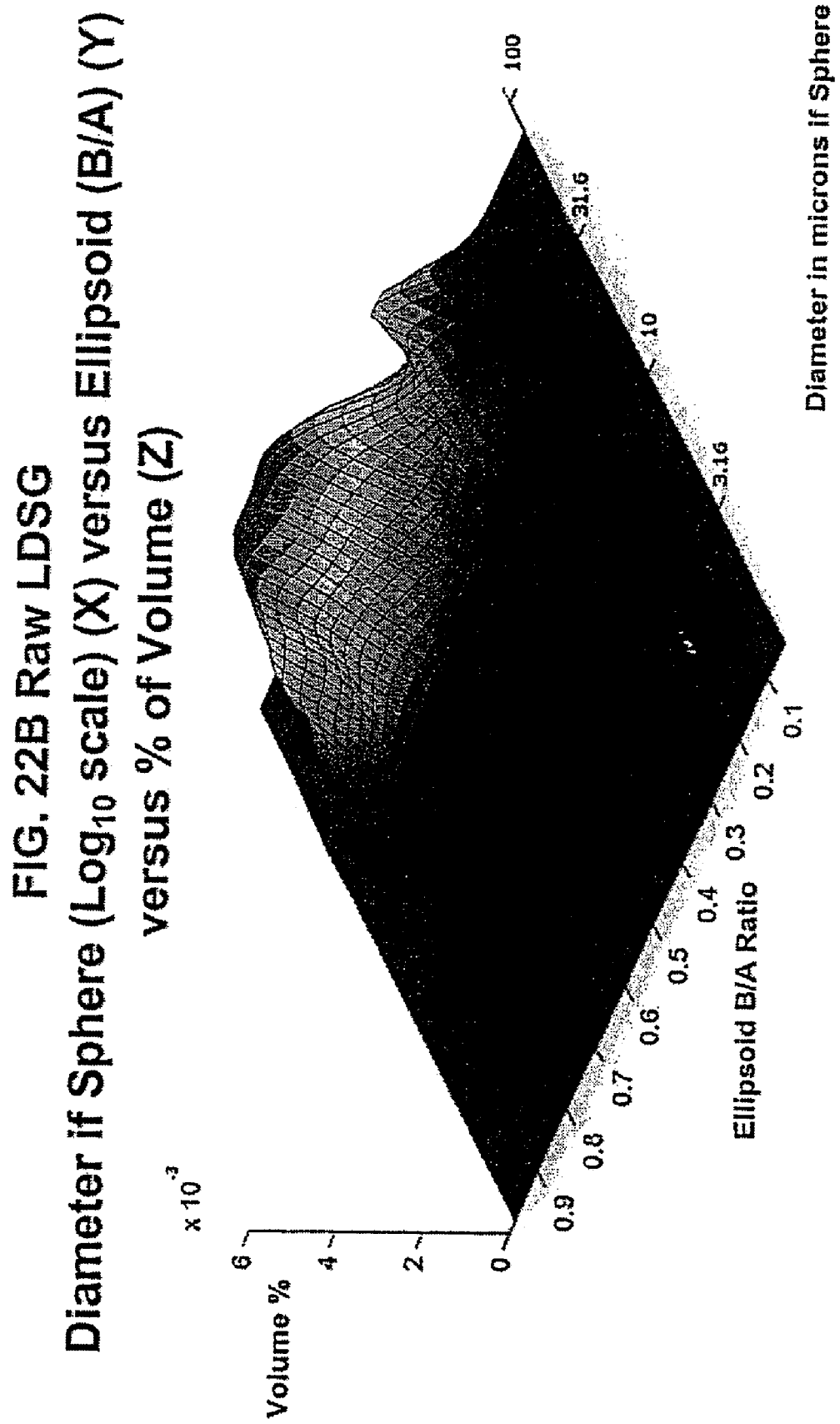

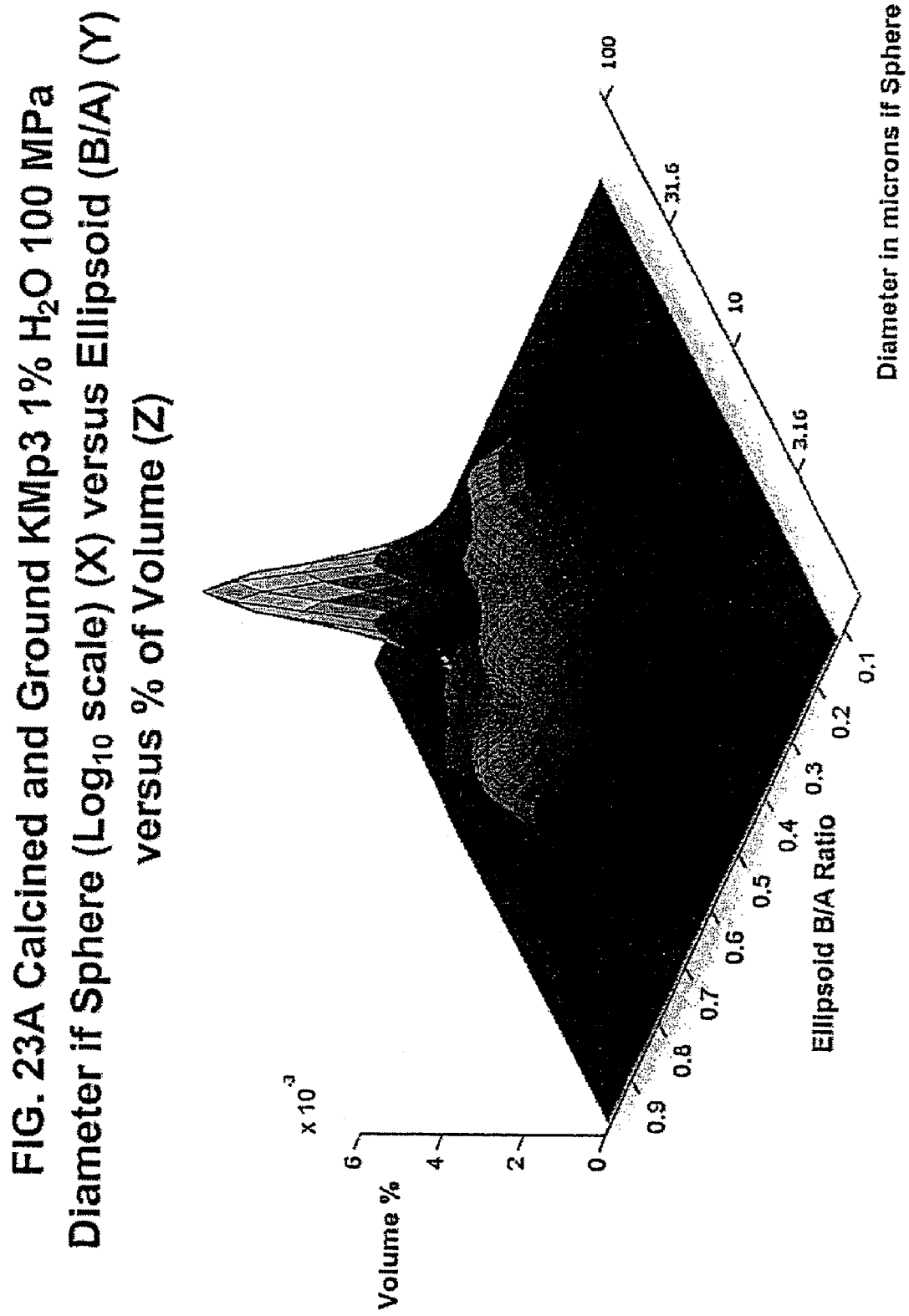
FIG. 23A Calcined and Ground KMp3 1% $H_2O$ 100 MPa Diameter if Sphere ($Log_{10}$ scale) (X) versus Ellipsoid (B/A) (Y) versus % of Volume (Z)

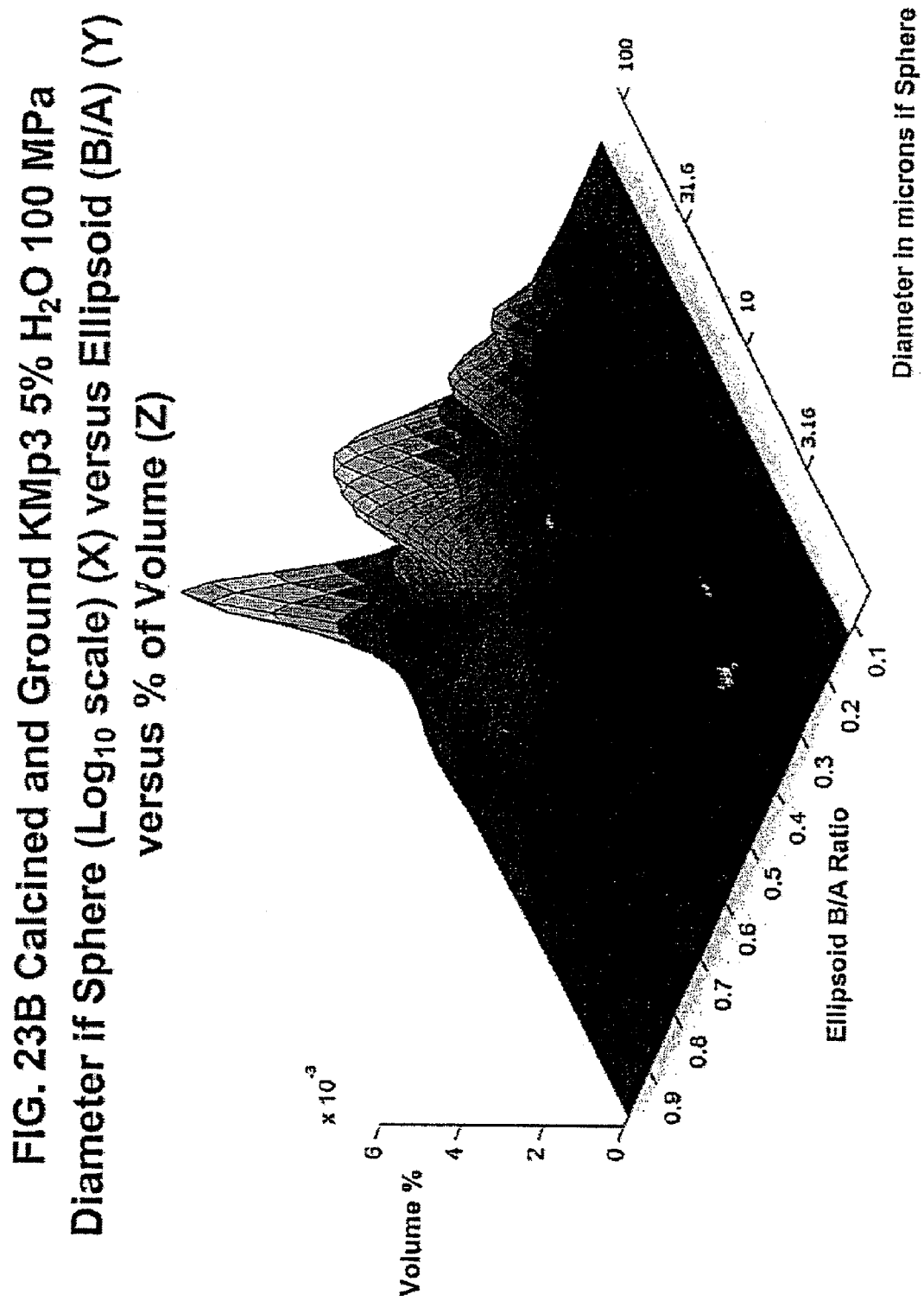
FIG. 23B Calcined and Ground KMp3 5% $H_2O$ 100 MPa Diameter if Sphere ($Log_{10}$ scale) (X) versus Ellipsoid (B/A) (Y) versus % of Volume (Z)

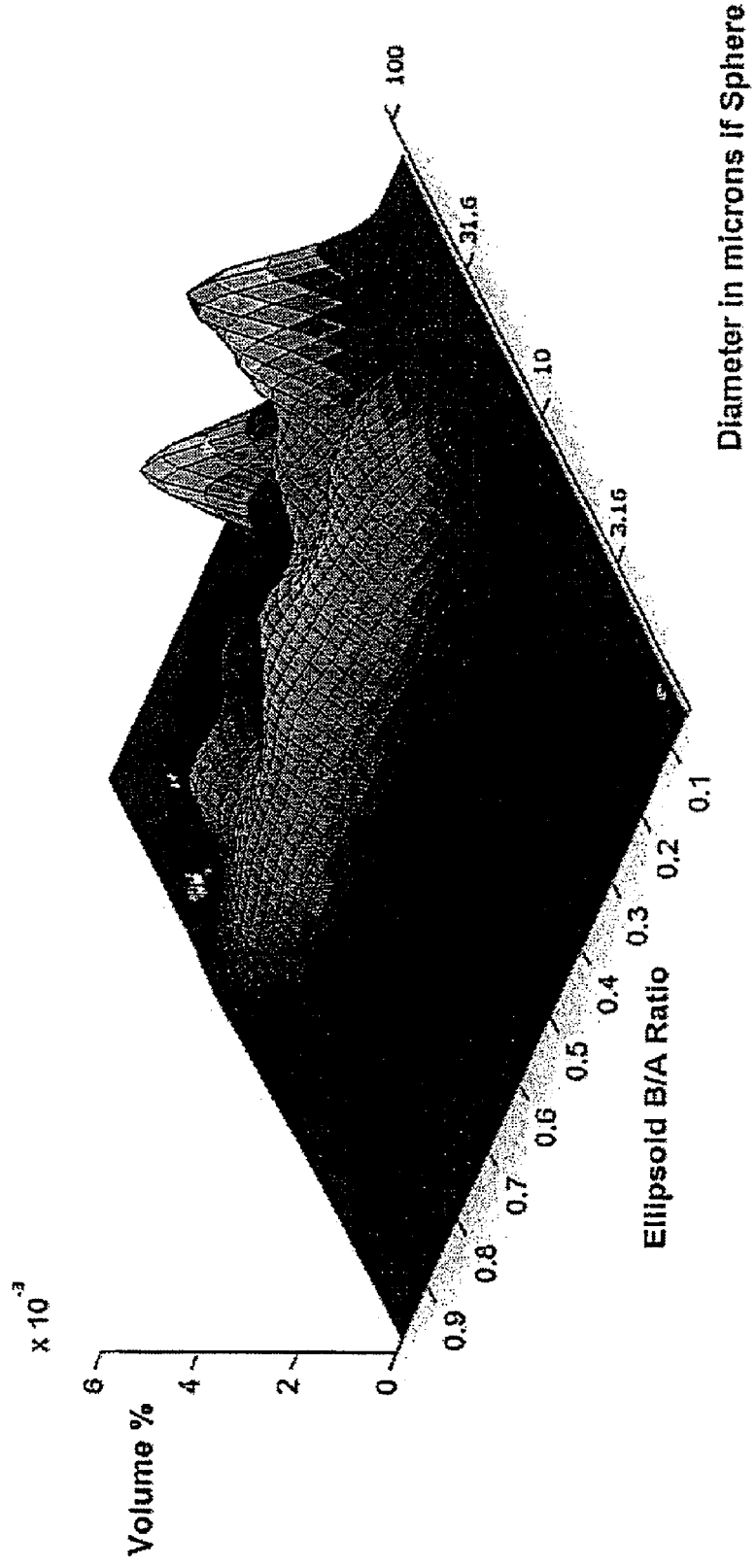
FIG. 23C Calcined and Ground LDSG 5% H₂O 100 MPa Diameter if Sphere (Log₁₀ scale) (X) versus Ellipsoid (B/A) (Y) versus % of Volume (Z)

ALPHA-TYPE CALCIUM SULFATE HEMIHYDRATE COMPOSITIONS

CLAIM OF PRIORITY

This is a divisional application of application Ser. No. 11/080,153 filed Mar. 15, 2005, entitled "Alpha-Type Calcium Sulfate-Based Composition and Methods of Making Same", which is a continuation of application Ser. No. 10/800,780, filed Mar. 15, 2004, entitled "Calcium Sulfate-Based Compositions and Methods of Making Same," to which this application claims priority and incorporates herein by reference in its entirety, and which claims the benefit of U.S. provisional Application No. 60/456,207, filed Mar. 20, 2003, entitled "Gypsum-Based Composition and Methods of Making Same," which is also incorporated herein by reference in its entirety.

BACKGROUND

1. Field of the Invention

The present disclosure is generally related to gypsum-based and calcium sulphate-based compositions and methods of making the same and, more particularly, is related to construction-grade gypsum-type compositions and methods of making the same.

2. Description of Related Art

Gypsum and calcium sulphate-based compositions and compounds are used in a variety of industries, particularly in the construction industry. For example, gypsum plaster is widely used in construction products such as self-levelers, such as in poured floor technology and repair mortars. Using heat to drive water from gypsum, or calcium sulfate dihydrate ($CaSO_4.2H_2O$), to form calcium sulfate hemihydrate ($CaSO_4.\frac{1}{2}H_2O$) generally produces gypsum plaster used in these products. The gypsum plaster is also referred to as plaster of Paris or stucco.

There are a number of processes used to perform the dehydration, or calcination, process. Calcination may be performed by, for example, flash drying at high temperature, cooking in large kettles, heating in furnaces or rotary kilns, using steam, or cooking in aqueous suspensions. These many different techniques can result in plasters with a wide range of composition and properties, but generally two types are formed: alpha-hemihydrate type and beta-hemihydrate type. These two types are distinguished from one another by the amount of water that is necessary to make a pourable slurry with the finely ground powdered hemihydrate, with alpha-hemihydrate requiring less than about 50 mL per 100 g of plaster, and beta-hemihydrate requiring substantially above this amount, normally more than 70 mL per 100 g of hemihydrate plaster. This amount of water is known as the water demand.

A process is known for making alpha calcium sulfate hemihydrate suitable for a construction material from a moist finely divided gypsum obtained by desulfurization of flue gas from a power plant fired by brown coal or lignite, especially from a gypsum obtained by flue gas desulfurization from a wet flue gas desulfurization unit (called desulfogypsum or DSG). This process proceeds by recrystallization transformation of the calcium sulfate dihydrate contained in the DSG in the presence of saturated steam.

Different processes are known for transforming calcium sulfate dihydrate into alpha calcium sulfate hemihydrate. One such process for making the alpha-hemihydrate from natural gypsum is described in *Ullmans Encyclopedia of Industrial Chemistry*, 12, 301 (1976). In this process, calcium sulfate dihydrate pieces, namely naturally-occurring gypsum pieces, are fed to an autoclave and are converted to alpha-hemihydrate pieces in the autoclave in the presence of saturated steam at a temperature of 266° F. to 275° F. This alpha-hemihydrate product is dried above the temperature that hemihydrate will convert back to calcium sulfate dihydrate (~113° F.) and is ground up for further use.

More specifically, the gypsum removed from a natural deposit is broken up into a grain size of 150 to 300 millimeters (mm), is filled into baskets, and is fed to an autoclave in the baskets. The autoclave is directly or indirectly heated with steam from 266° F. to 275° F. The heating is controlled so that a pressure of 4 to 5 bar (0.4 to 0.5 MPa) builds up in about four hours according to a saturated steam curve. Transformation of the calcium sulfate dihydrate to alpha-hemihydrate by this process usually takes at least six hours. The autoclave is then emptied.

The alpha-hemihydrate gypsum is introduced into a drying chamber in the baskets and dried under standard pressure at about 221° F. and subsequently finely ground. In the surface regions of the pieces of material, well-defined alpha-hemihydrate crystals grow in a more or less needlelike shape. FIG. 1 shows a scanning electron microscope (SEM) micrograph of an example of the needlelike crystals of alpha-hemihydrate obtained by this process.

Additives for control of the pH-value and for changing the crystal pattern can be metered into the autoclave and a product alpha-hemihydrate with various properties is obtainable. In this known process, however, the expensive purification steps are troublesome. In this process, distinct alpha-hemihydrate crystals arise more by chance, and control of the process in regard to crystal pattern and surface fine structure of the crystals formed is not provided.

In attempting to solve this problem, one process described in, for example, U.S. Pat. No. 5,015,449 issued to Koslowski, forms moist fine grained gypsum (calcium sulfate dihydrate) into a molded body at a pressure between 0.1 to 14 $N/mm^2$ (MPa). Koslowski states that when forming a molded body by pressing the calcium sulfate dihydrate at pressures greater than 16 $N/mm^2$, "one of course obtains molded or formed bodies but they are not autoclavable without forming fractures or cracks and are destroyed during autoclaving." Koslowski at column 7, lines 41-45.

The molded gypsum body of the process disclosed in Koslowski has a total volume of 15 to 60% by volume pore volume, with more than 5% by volume of the pore volume containing air. When the starting material is wet, the remaining balance of the pores is filled with water. The molded body is then fed into an autoclave. The crystal growth and crystal pattern of the alpha-hemihydrate is regulated by control of a process temperature in the range between 230° F. and 356° F. and by pressure of the process atmosphere in the autoclave. The molded body is removed from the autoclave and delivered for use after the recrystallization transformation.

Prismatic columnar alpha calcium sulfate hemihydrate crystals are produced from this process, a SEM micrograph of which is shown in FIG. 2. The calcination time for the process for producing these crystals is approximately four to seven hours per batch. This long cycle time makes this process difficult and expensive from a production efficiency standpoint.

Thus, a heretofore unaddressed need exists in the industry to address the aforementioned deficiencies and inadequacies.

SUMMARY

Embodiments of the present disclosure provide a calcium sulfate hemihydrate [alpha-type] ("alpha-hemihydrate") with improved crystal morphology, methods of making alpha-hemihydrate, and products made with the disclosed alpha-hemihydrate.

Briefly described, one embodiment of such a method of producing the alpha-hemihydrate with improved crystal morphology includes forming calcium sulfate dihydrate into a briquette under high pressure, calcining the briquette to transform the calcium sulfate dihydrate to alpha-hemihydrate, drying the briquette, and optionally grinding the briquette. In one embodiment of the disclosed alpha-hemihydrate, the alpha-hemihydrate crystals are grown together to form clusters of the crystals, with substantially reduced pore volume between the agglomerated clusters, as compared to the pore volume of alpha-hemihydrate made from briquettes formed under pressures less than or equal to 14 megapascal (MPa). One embodiment of a product made with the disclosed alpha-hemihydrate includes a mixture of the disclosed alpha-hemihydrate and water.

BRIEF DESCRIPTION OF THE DRAWINGS

Many aspects of the disclosure can be better understood with reference to the following drawings. The components in the drawings are not necessarily to scale. Moreover like reference numerals designate corresponding parts throughout the several views.

FIG. 4 is a representation of the water content and pressure ranges that yield the disclosed briquettes, and the quality of briquettes produced.

FIG. 5 is a graphical representation of the rate of calcinations of exemplary briquettes versus a block.

FIG. 6 is a graphical representation showing the rate of conversion of gypsum to hemihydrate throughout the interior of a calcined block as performed using the prior art process, demonstrating the relatively long calcination time needed for the prior art process.

FIG. 8 is a graphical representation of autoclave temperature, comparing a pilot trial versus lab calcination.

FIG. 9 is a graphical representation of the rate of calcination of two different synthetic gypsum sources that have been briquetted and calcined using an embodiment of the disclosed process.

FIG. 10 is a graphical representation of the effect of the process variable of pressure on the rate of calcination of gypsum to hemihydrate using an embodiment of the disclosed process.

FIG. 11 is a schematic detailing the layout of lab scale custom grinding equipment.

FIG. 12 is a graphical representation of the water demand of exemplary hemihydrate materials prepared by an embodiment of the disclosed process from various sources of gypsum.

FIG. 13 is a graphical representation of the water demand of various hemihydrate materials that were prepared from an embodiment of the disclosed process, with increasing pressure used in making briquettes.

FIG. 14I is the scale.

FIG. 15 is a graphical representation of the water demand of exemplary hemihydrate materials prepared from an embodiment of the disclosed process with increasing water content in making briquettes.

FIG. 16 is graphical representation of the water demand of exemplary hemihydrate materials that were prepared from an embodiment of the disclosed process with exemplary additives to the gypsum used in making briquettes or added to the briquettes directly.

FIG. 17 is a bar chart illustrating the void content of the exemplary calcined briquettes prepared using an embodiment of the disclosed process.

FIG. 18 is a bar chart illustrating the void content of the exemplary uncalcined briquettes prepared using an embodiment of the disclosed process.

FIG. 19 is a graphical representation of impact of drying temperature on the drying rate of exemplary calcined but wet large briquettes made by embodiments of disclosed processes.

FIG. 20 is a graphical representation of impact of drying/crushing on the drying rate at 194° F. of exemplary calcined but wet large briquettes made by embodiments of disclosed processes.

FIG. 21 is graphical illustration of the dependence of the compressive strength of an exemplary product made from alpha-hemihydrate on the percentage of sand replaced by fly ash.

FIGS. 22A and 22B are computer-generated graphical illustrations of particle size and shape distribution data of exemplary raw material gypsums.

FIGS. 23A-23C are computer-generated graphical illustrations of particle size and shape distribution data of the gypsum of FIG. 9 after being subjected to embodiments of disclosed processes.

DETAILED DESCRIPTION

As identified in the foregoing, gypsum plaster, or calcium sulfate hemihydrate ($CaSO_4 \cdot \frac{1}{2}H_2O$) [alpha-hemihydrate] (hereinafter "alpha-hemihydrate") and methods for producing it have lengthy calcination times, and are therefore expensive, and not always sufficient to produce a consistent alpha-hemihydrate. In attempting to solve some of these problems, other methods for producing the alpha-hemihydrate have been developed that involve expensive additives and/or processes which are complicated to install and operate, often resulting in lengthy calcination times while still not producing an alpha-hemihydrate with optimal crystal structure. Therefore, needed is an alpha-hemihydrate that is quick and easy to produce with an optimal crystal structure for producing strong gypsum plaster products. Disclosed is an improved alpha-hemihydrate product that is more ideally formed to produce a high strength, low water demand plaster upon subsequent grinding and drying. In addition, the process by which this improved alpha-hemihydrate is manufactured is easier and more efficient than other known methods of producing alpha-hemihydrate.

Figure 1:
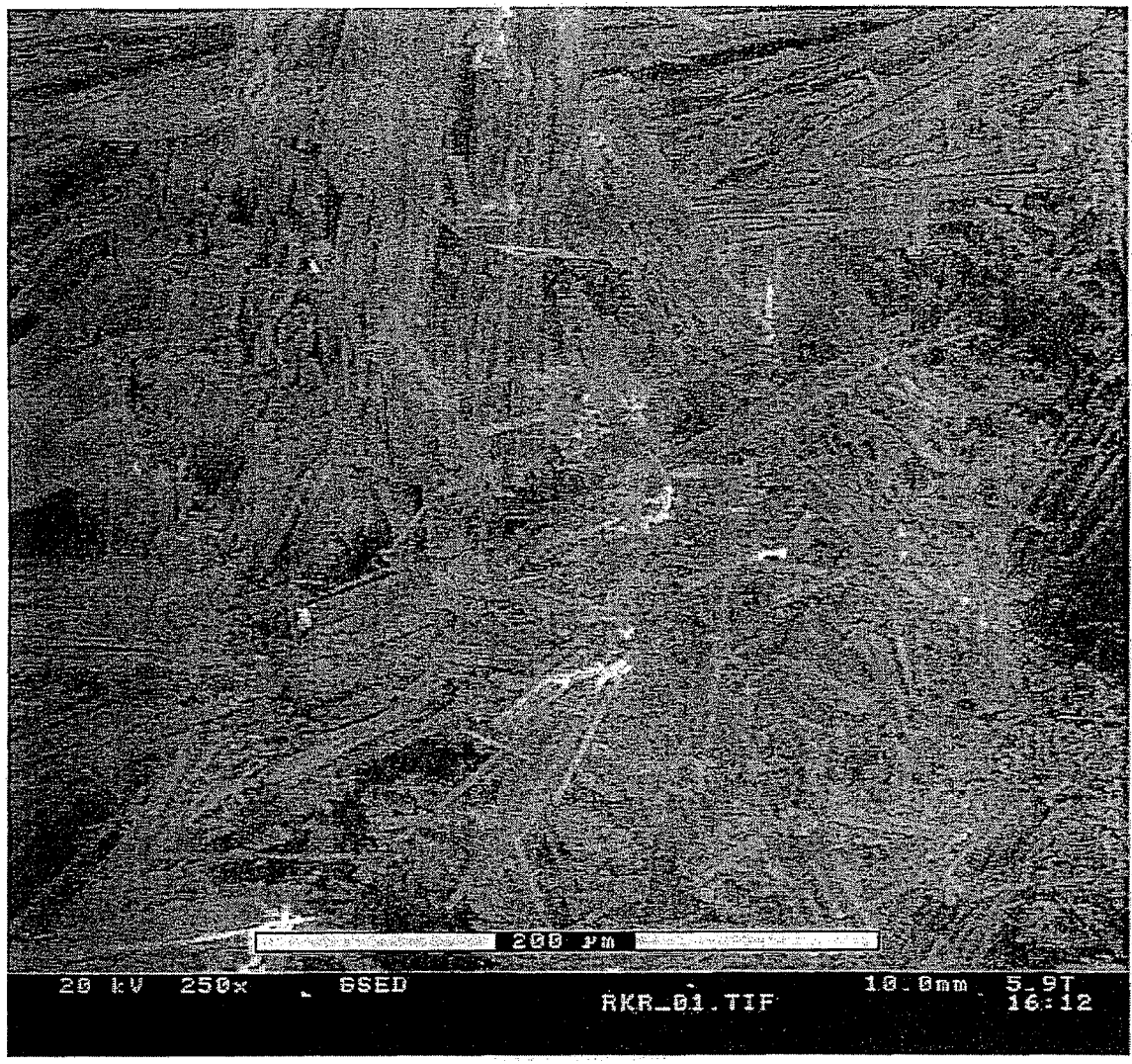
FIG. 1 is a scanning electron microscope (SEM) micrograph depicting crystals of prior art calcium sulfate hemihydrate [alpha-type] ("alpha-hemihydrate") formed from calcination of calcium sulfate dihydrate rock.
Figure 2:
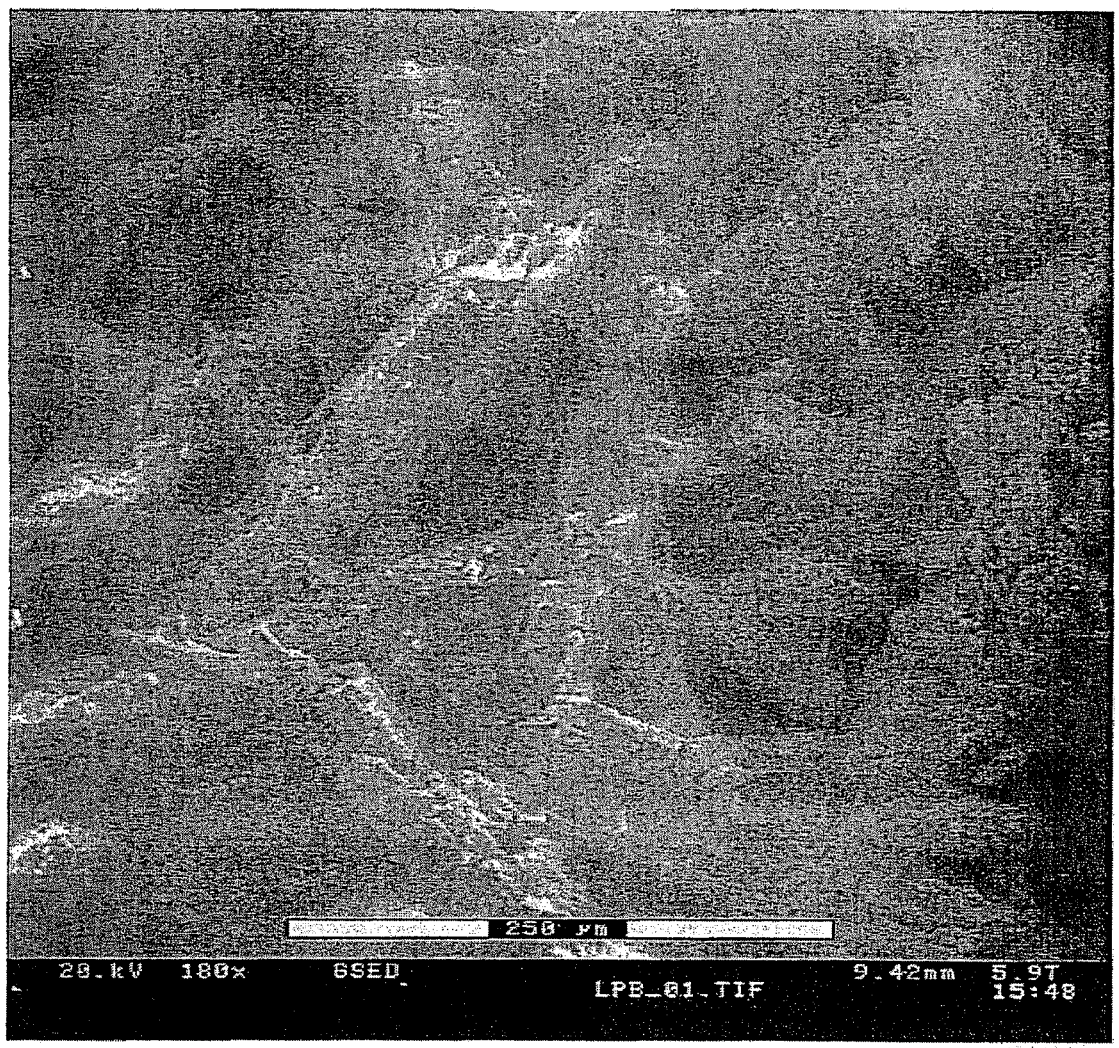
FIG. 2 is a SEM micrograph depicting crystals of prior art alpha-hemihydrate formed from calcination of molded calcium sulfate dihydrate.
Figure 3:
FIG. 3 is a SEM micrograph depicting crystals of the disclosed improved alpha-hemihydrate.
Figure 7A:
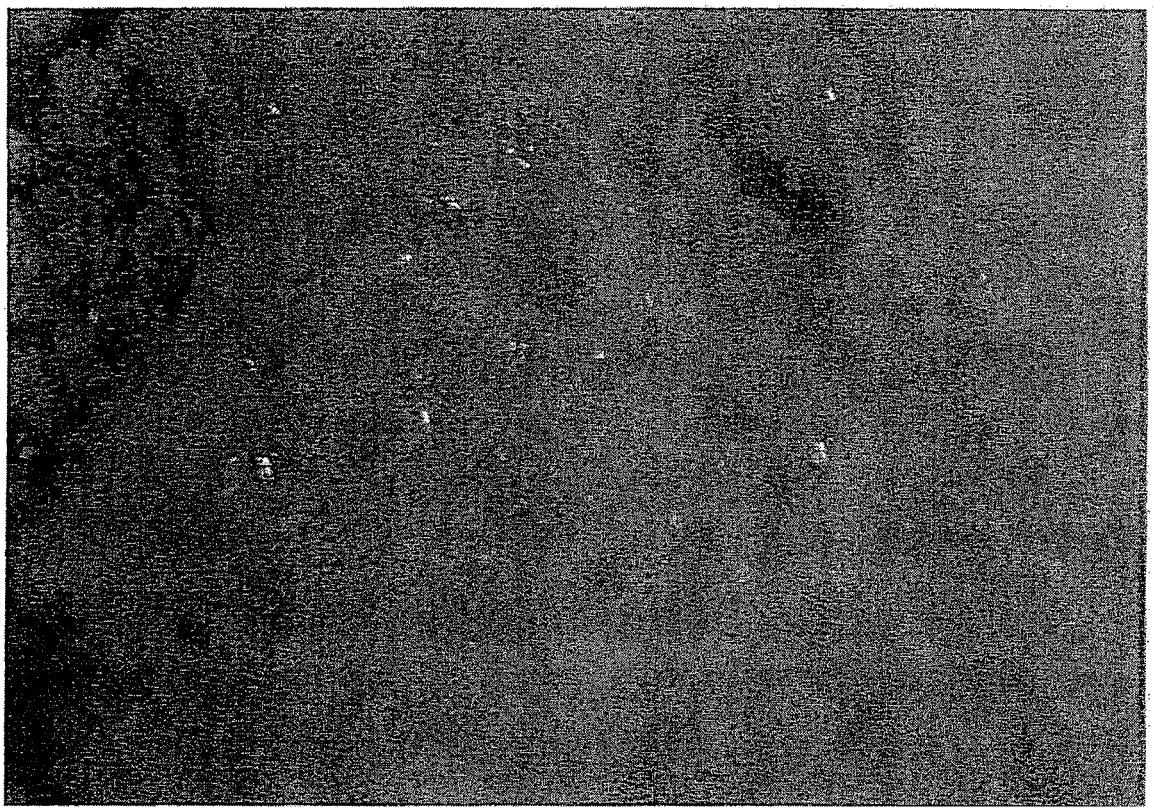
FIGS. 7A-7D are microscope pictures showing crystal growth over increasing calcination time for Kerr-McGee gypsum.
Figure 7B:
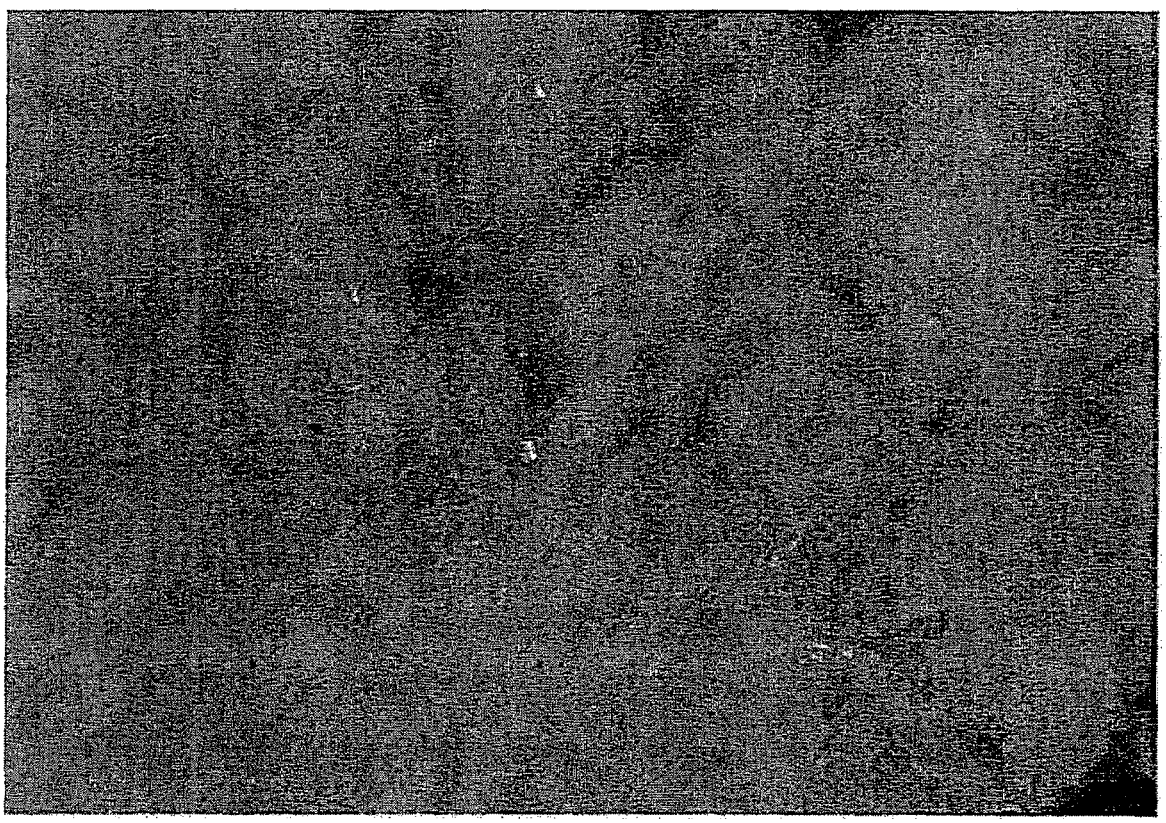
Figure 7C:
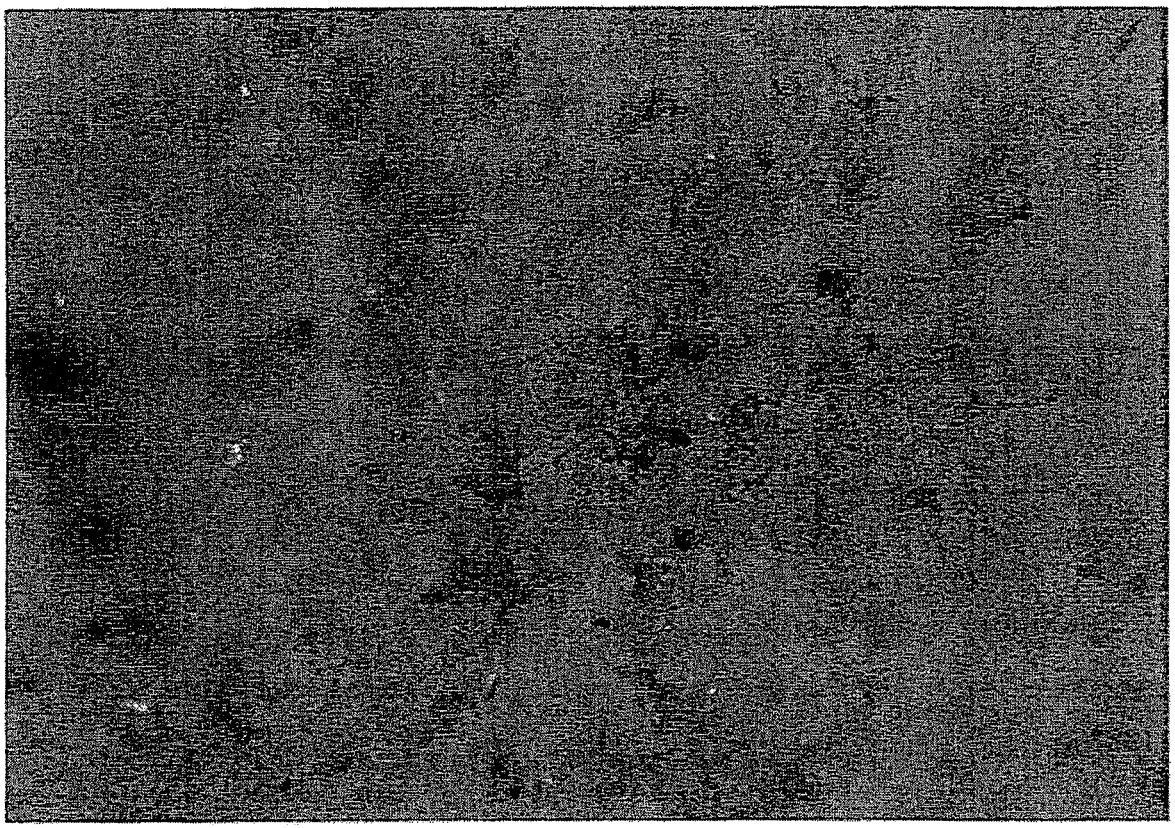
Figure 7D:

Referring now to FIG. 3, shown is a scanning electron microscope (SEM) micrograph of crystals of the disclosed improved alpha-hemihydrate. It is known that individual crystals of the alpha-hemihydrate have an average particle diameter of approximately 20 microns (μm) (FIG. 2). As can be seen from the scale of the micrograph in FIG. 3, the average particle diameter of the clusters or agglomerates of the improved alpha-hemihydrate crystals is about 100 μm. As can be seen in comparison with the alpha-hemihydrate crystals of FIGS. 1 and 2, the improved alpha-hemihydrate clusters of FIG. 3 have a smaller pore volume, with the disclosed alpha-hemihydrate crystal clusters being larger and more blocky than the needlelike and columnar crystals of FIGS. 1 and 2. This "blockier" crystal structure leads to improved properties in the material, such as reduced water demand. Blockier crystals lead to a more efficient packing volume, which reduces the amount of water used to create the desired slurry. In addition to shape characteristics, particle size is also a contributor to water demand properties. A broad particle size distribution of spherical or blocky crystals allows maximum packing efficiency and lowest water demand.

An exemplary embodiment of a method for making the alpha-hemihydrate includes forming calcium sulfate dihydrate ($CaSO_4.2H_2O$) (hereinafter "dihydrate") into a briquette under high pressure, calcining the briquette to transform the calcium sulfate dihydrate to alpha calcium sulfate hemihydrate, drying the briquette, and grinding the briquette. The dihydrate used to form the briquettes includes natural gypsum from mines and quarries around the world, as well as byproduct gypsum from a variety of chemical processes. Some examples of these chemical processes include the desulfurization of flue gases, the production of titanium dioxide, the production of phosphate-based fertilizers, the neutralization of waste sulfuric acid streams from chemical processes, or the production of organic acids and their salts, such as citric acid, citrates, etc. Recycled gypsum from gypsum products would also be suitable for this process. Specific examples of dihydrate material include but are not limited to, Lambton desulfogypsum (LDSG), Kerr-McGee gypsum (KMG), natural gypsum from near Drumbo, Ontario, Canada, natural gypsum from near Fort Dodge, Iowa, USA ("Fort Dodge Land Plaster", or FDLP) and recycled gypsum board core.

Contrary to what has been taught in the prior art, the inventors have unexpectedly determined that forming a dihydrate briquette under high pressures yields a briquette that is not cracked or destroyed during the calcination process. It may be noted that for some combinations of pressure of formation and free water content, some minor cracking may be observed, but this cracking does not destroy the briquette nor prevent it from being usable. For each investigated material, an optimized combination of high pressure of formation and free water content to produce an uncracked briquette was achievable. In one example, the briquette may be formed under a pressure greater than approximately 14 megapascals (MPa) up to a pressure at which the briquetting machine cannot practically work, currently about 320 MPa For example, when compressing dihydrate with relatively little or no added water, at extremely high pressure, e.g., about 320 MPa, the briquetting machine begins to screech at such a high decibel level that an operator, even with the use of ear protection, cannot tolerate it. For dihydrate to which water has been added, at high pressures, e.g., about 320 MPa, the briquettes begin to stick or adhere to the machine parts. Thus, the upper limit of pressure under which the briquettes may be formed is largely a function of the operating limits of the briquetting machine. In theory, future advancements in briquetting technology to allow even greater pressure may be even more ideal than the current investigated pressure limits.

In another example, the briquettes may be formed under a pressure of about 50 to 300 MPa. In another example, it has been determined that the briquettes formed under a pressure of 100 to 200 MPa exhibit beneficial properties. FIG. 4 shows a schematic detailing a region of pressure and moisture within which briquettes can be formed. These process variables contribute directly to the ability to adequately create and handle the uncalcined gypsum product, herein referred to as the "quality" of briquettes formed. This quality of briquettes is also a function of the gypsum source material used.

There are several factors that can affect the ease with which the briquettes can be made, as well as the overall strength of the briquettes. The strength of the briquettes impacts their ability to be transported, conveyed, etc. without damage. The prior art describes a process whereby gypsum is formed into blocks of size about 10 cm by 20 cm by 20 cm, made at a pressure of under 14 Mpa. The briquettes used in the process disclosed herein may range in size, for example, from about 0.125 ("smaller" type) to 125 ("larger" type) cubic inches. In another example, the briquettes are about 1 to 27 cubic inches. It has been determined that in another example, briquettes of about 1 to 8 cubic inches exhibit beneficial properties. For example, the briquette may be approximately two square inches by one inch thick. The term "briquette" as used herein means a compacted shaped mass of dihydrate material formed under pressure. The brick-shaped mass can be, for example, pillow-like (as in shape of charcoal briquettes used for charcoal barbecue grills), puck-like, tablet-like, cylindrical, flat plates, etc.

The dihydrate briquettes formed under the disclosed high pressures typically have physically bound water in a range from about 15 to 21% by weight. This is for 75 to 100% pure gypsum. Preferred is 85-100% pure gypsum or 17 to 21% physically bound water, and most preferred is 93 to 100% pure gypsum or 19.5 to 21% physically bound water.

In addition to, and different from, physically bound water, the briquettes may also include free water added to the briquette to facilitate processing (e.g., to lubricate the briquette during pressing or formation of the briquette and thus increase the compressibility of the dihydrate material). Additionally, free water added to the briquette may aid in the recrystallization process by assisting in the heat transfer and/or recrystallization during calcination of the briquette. With a special feeding mechanism and production-scale briquetting equipment, it is possible to make briquettes with no moisture, or in the moisture range of just greater than 0% up to 12% by weight. In one example, the free water is about 1 to 5% by weight of the briquette. It has been determined that a free water content of about 2 to 3% by weight yields beneficial results during the disclosed methods for producing the disclosed hemihydrate.

The disclosed dihydrate briquettes were calcined at a temperature in the range of about 248 to 284° F. The dihydrate briquettes formed under a high pressure as described above calcine at much faster rates than has traditionally been accomplished with gypsum. For example, as can be seen from FIG. 5, when using KMG, the disclosed method substantially completes the transformation of the dihydrate to the alpha-hemihydrate during calcination in less than approximately 1 hour, whereas the larger blocks as per the prior art are only about 40% complete in about a 3-hour time frame.

FIG. 6 further illustrates that if the gypsum blocks as described in the prior art are examined after 3 hours, rather than the normal calcination time of 6 hours, the dehydration on the edges of the block are substantially complete, e.g., in the conversion of gypsum to hemihydrate. However, a sample taken from the face to a depth of ½ inch is not fully calcined, and a sample taken from the interior of the block was hardly calcined. Note that "substantially complete" as used herein means that approximately 93% of the briquette is transformed to alpha-hemihydrate, with about 3 to 4% remaining as the dihydrate. The remaining 3 to 4% can be, for example, various mineral impurities.

Percent composition of dihydrate, hemihydrate, free water, and other material may be determined through a gypsum phase analysis procedure as follows. Weigh an empty container and record identifier found on container. Add about 4 to 6 grams of sample to the container (previously fine ground with mortar and pestle). Record the weight of the sample and container and leave in air preferably 60-80% relative humidity) overnight. Dry the sample for about 2 hours at about 113° F. and weigh. Carefully add about 20 mL of distilled water, making sure to wet all the powder. Let stand on counter covered for about 2 hours. Put in an oven overnight at about 113° F. and record weight. Heat the sample for about 2 hours at about 572° F. Place sample on cooling tray and cover. Weigh again as soon as cool enough to handle. Calculate % water, % anhydrite (III), % dihydrate, % hemihydrate, and % weight other.

Microscopic examination of the briquettes can follow the calcination process as shown in FIGS. 7A-7D. The briquettes made from KMG as described in FIG. 4 were broken open and examined to determine the crystal size and shape as the calcination proceeded. After about 15 minutes (FIG. 7B), the crystals in the midst of the briquettes looked similar to the initial briquette before calcining (FIG. 7A), but there was evidence of clear crystals beginning to form in the overall mass of small white gypsum crystals. By about 45 minutes (FIG. 7C), the larger clear crystals of presumably hemihydrate had grown to represent almost all of the material in the field of view. After about 6 hours (FIG. 7D), the overall structure looked similar, with some sign of the hemihydrate crystals being marginally larger than at 45 minutes.

The calcination time can be optimized through choice of briquette size, pressure under which the briquette is formed, moisture content of the briquette, type of gypsum calcined, and autoclave used in the calcination. Briquettes were made by two generally different techniques, one a "lab" method with good control of process parameters, and the second using commercially-available briquetting equipment.

The lab technique is as follows: the starting material was spread over a flat area (e.g., baking sheet or clean counter top) and a rolling pin was used to break down the larger pieces of material. A calculated amount of water was added evenly using a spray bottle, and the material was mixed thoroughly. The desired amount of material was placed into a cylindrical mold with cup-shaped forming surfaces. The material in the mold was pressurized with a hydraulic press (from Forney Inc. Hermitage, Pa., USA) with a Gauge Buster indicator (from Admet Inc. of Norwood, Mass., USA). The amount of weight used to achieve the desired briquette pressure (the area of the piston must be known) was calculated, and the press was advanced until the meter measured this amount. The piston was retracted and the briquette was removed from the mold. The briquettes were stored in a resealable bag for subsequent autoclaving. The autoclave used was a Magnaclave™ Model MC autoclave, manufactured by Pelton & Crane of Charlotte, N.C., USA. After autoclaving, the briquettes were dried overnight at 194° F. in a Yamato DKN600 constant temperature oven from Yamato Scientific America Inc., Orangeburg, N.Y., USA. Briquettes created through this procedure herein after are referred to as "lab briquettes."

The "pilot scale" briquetting was accomplished as follows: briquettes were formed by K R Komarek Briquetting Research, Ltd. in Anniston, Ala., USA, on a model B-400A™ or B-220QC roller press, manufactured by Komarek. Material from the feed hopper was supplied onto the roll nip with a horizontal screw, driven by a variable speed drive unit. A paddle mixer was utilized to agitate material into the horizontal screw at the feed inlet. The material was then compacted between two rolls which were cantilevered on the ends of shafts outside the bearing blocks. A fully adjustable hydraulic system provided the force holding the rolls together. This force is equal in magnitude to the roll-separating force generated by the compacted material in the roll nip. A gas-filled accumulator in the hydraulic system acts as a pressured reservoir and accumulator pre-charge pressure determines the hydraulic system stiffness. Some briquettes made with the Komarek briquetting machine were autoclaved and dried as per the lab scale procedure as previously explained. Briquettes created through this procedure herein after "pilot briquettes."

In addition to the lab scale autoclaving, a large pilot scale autoclaving trial was performed using a production size autoclave from Bondtech Inc. of Salisbury, N.C., USA. The equipment used had a cylindrical pressure chamber approximately 5 feet tall and 10 feet long with a door at one end. Steam was provided to the pressure chamber from a separate boiler, feeding several other units in the factory, thus rendering more capacity than needed for this particular single unit. The pressure vessel was also equipped with a vacuum system to enable the evacuation of most of the air from the chamber, if desired.

Gypsum briquettes were prepared by the smaller scale pilot process described earlier at about 1-2% moisture and pressure about 178 MPa to give briquettes of dimensions 1.6×1.0×0.5 inches and weight of about 22 g. A large quantity of these briquettes (about 1717 lbs.) was loaded into two wire baskets of dimensions about 3 feet tall by 4 feet square and placed in the pressure chamber. A thermocouple was embedded 12 inches into the bed of briquettes to monitor the temperature in the briquettes during the calcination. The pressure chamber was evacuated and then pressurized with live steam to bring the temperature to about 270° F. in the chamber. FIG. 8 shows the temperature curve of this pilot scale autoclave calcination, compared to the temperature curve obtained from the lab scale calcination. As can be seen from the temperature curves, the pilot scale apparatus gave a very similar temperature profile, but with a more accentuated dip in the temperature shortly after reaching set point temperature that lasted for about 30 minutes. Without being bound by theory, it is presumed that the dip in temperature is the result of the endothermic calcination process taking place by the briquettes, consuming the heat from the live steam and dropping the temperature.

After 140 minutes the autoclave was vented and the door was opened to allow the placement of six forced air space heaters (each of capacity 1500 watts) around the outside of the wire baskets to assist in the drying of the hot briquettes in the pressure vessel. There was considerable heat available from the 6000-lb. vessel itself as the vessel cooled, but there was no heat applied during the drying process other than these portable space heaters. During the drying process, the door of the vessel was opened 1.5 to 3.5 inches to allow the water vapor to escape, while minimizing cooling of the briquettes from ambient air.

After 5.5 hours, the wire baskets were removed from the chamber and weighed to determine the water lost from the gypsum briquettes. Since the briquettes were still wet, the free water in the briquettes was available to convert the hemihydrate back to gypsum, but the overall weight loss is still valid. Of the original gypsum weight of 1717 lb of gypsum briquettes, there was 182 lbs. of water lost during this calcination and drying. For briquettes of 95% pure gypsum at 1% water, the theoretical loss for conversion of gypsum to hemihydrate is 270.7 lb. The briquettes were dried about 67% to completion.

Exemplary briquettes taken for analysis confirmed this result. The briquettes were not analyzed immediately and thus were allowed to cool, letting any free water convert the hemihydrate back to gypsum. Briquettes on the surface of the bed of briquettes closest to the door analyzed at 94.22% hemihydrate, 2.73% gypsum, and 0.39% water. Briquettes on the top surface at the back of the second basket analyzed at 89.07% hemihydrate, 4.04% gypsum, and 0.39% free water, showing that some of the remaining water had converted some hemihydrate to gypsum. Briquettes buried 8 inches from the surface in the basket furthest from the door were quite wet and analyzed at only 34.4% hemihydrate, 53.1% gypsum, and about 1.3% free water.

As shown by FIG. 9, different gypsum materials may calcine at different rates, with the KMG from titanium oxide production calcining slightly slower than the LDSG from flue gas scrubbing.

The effect of calcination temperature on rate of calcination was investigated, and it was determined that all samples tested at both 240° F. and 270° F. with calcination times greater than 30 minutes showed similar degrees of calcination and were all fully calcined. It is possible that higher temperatures of calcination may increase the rate of calcination at lesser calcination times.

As shown in FIG. 10, with a 30-minute calcination time, there is an increase in rate of calcination with increasing pressure of briquette formation.

The use of additives has also shown that the rate of calcination can be affected. Additives are often used in the production of alpha hemihydrate via the wet autoclave process in order to modify the crystal shape and reduce water demand of the final product. The additives can be accelerators, e.g., potassium sulfate, to speed up the recrystallization process, and crystal habit modifiers, e.g., succinic acid (or the corresponding salts), to change the shape of the crystals from needle-like to a more manageable form. Data shown in Table 1 below illustrates that the crystal habit modifiers may slow down the rate of conversion to some degree. The use of potassium sulfate under these conditions may marginally speed up or slow down the rate of calcinations, depending on concentrations added.

TABLE 1

Rate of Calcination; Effects of Additives KMp3 3% $H_2O$ 200 MPa 270° F. 150 min

| Additive (% by weight) | | % |
| --- | --- | --- |
| Sodium Succinate | $K_2SO_4$ | hemihydrate |
| 0.0 | 0.0 | 92.15 |
| 0.1 | 0.0 | 93.75 |
| 1.0 | 0.0 | 89.37 |
| 0.0 | 0.1 | 92.81 |
| 0.0 | 1.0 | 91.17 |
| 0.1 | 1.0 | 88.65 |

Data presented in Table 2 below illustrate that the impact of changing pressure and moisture content, although demonstrating positive benefits in the 30 minute calcinations time scale, did not positively affect the overall degree of calcination at 2.5 hours for lab briquettes, because the conversion to hemihydrate was already complete by this time.

TABLE 2

Rate of Calcination; Effects of $H_2O$ on Various Gypsums and Pressures @ 270° F., 150 min

| Gypsum Source | Pressure (MPa) | % free $H_2O$ added | % hemihydrate |
| --- | --- | --- | --- |
| KMp3 | 100 | 1 | 92.49 |
| KMp3 | 100 | 3 | 93.25 |
| KMp3 | 100 | 5 | 92.66 |
| LDSG | 14 | 1 | 94.65 |
| LDSG | 14 | 5 | 94.93 |
| LDSG | 14 | 10 | 95.14 |
| LDSG | 50 | 1 | 94.38 |
| LDSG | 50 | 5 | 94.92 |
| LDSG | 50 | 10 | 95.09 |
| LDSG | 200 | 1 | 95.07 |
| LDSG | 200 | 3 | 94.11 |
| LDSG | 200 | 5 | 94.74 |
| LDSG | 200 | 10 | 95.14 |

Taking the ease of briquetting into account, one exemplary gypsum briquette that can be converted by the disclosed methods is a large briquette at maximum moisture and maximum pressure (e.g., 4-5% water and maximum pressure without strain on the machine). A briquette at 5% moisture and high pressure works well but there is some risk of the dihydrate sticking to the briquetting machine for some types of gypsum and therefore lower pressures and/or water content may be necessary. If the dihydrate is too dry when the briquettes are made, the briquetting machine becomes extremely noisy and extra wear is put on the machine. In addition, water may be sprayed on the briquettes after formation to increase calcination rates but is more ideally added to the material before briquette formation to aid in compressibility.

As can be seen from the above discussion, different factors can affect both the speed of calcination and the ease of making good quality briquettes suitable for this process. It has also been found that these parameters can also impact the water demand of the hemihydrate plaster produced. The water demand properties can affect the finished product. For example, the strength of set gypsum slurry is much higher if the starting slurry is made with less water. In this case, the density of the final set gypsum matrix made from the disclosed alpha-hemihydrate is higher than the conventional alpha-hemihydrate. Therefore, the strength properties of the final gypsum matrix product are improved.

In the production of an alpha-hemihydrate plaster, the dehydration of the gypsum occurs in such a way that the crystals of alpha-hemihydrate grow in a blocky form. Upon grinding, a low water demand, alpha-hemihydrate fine powder is produced. With the faster conversion to hemihydrate, it is likely that the conversion to the alpha-type also takes place more quickly. Without being bound by any theory, it appears that the disclosed process creates conditions within the briquettes in the calcination chamber for a more rapid and more complete conversion to a form of hemihydrate material that subsequently results in a low water demand powder after grinding. The high temperature, high material density, and high water content that exist within the briquettes in the calcination chamber cause both the dehydration of gypsum and the conversion to the stable blocky form of hemihydrate.

Upon subsequent grinding of these calcined briquettes, a fine particle alpha-hemihydrate plaster of low water demand is produced.

One variable in determining water demand is grinding. Many grinding options are available to optimize water demand characteristics, but for the purpose of simulating a low-cost manufacturing plant environment, grinding procedures can be chosen to be as simple as possible. Briquettes were ground using the following procedure. Using a customized hammer mill grinding apparatus, as shown in FIG. 11, from Analytical Instruments Ltd., Minneapolis, Minn., USA and an air flow system from Shop-Vac Canada Ltd. of Burlington, Ontario, Canada (a 3.0HP Wet/Dry Vac air blower, a 4.5HP Quiet Super Power Wet/Dry Vac air vacuum and High Efficiency Disposable Filter Bags (906-71) for sample collection), the briquettes were ground through a 100-mesh screen (FIG. 11). The powder sample was then ball milled in a 7.5 inches diameter ×8 inches high cylindrical ball milling container with 60×1" steel balls using a QT12/QT66 Rotary Tumbler from Lortone Inc. of Mukilteo, Wash., USA, for 15 minutes.

Grinding to a surface area of about 3500 $cm^2/g$ can maximize strength of the final product made from the alpha-hemihydrate and to reduce the water demand of the alpha-hemihydrate. The term "surface area" as used herein refers to the Blaine surface area of the various materials. The surface area was tested using the standard ASTM test method C204-00. In one example, the alpha-hemihydrate has a Blaine surface area of about 2500 to 4500 $cm^2/g$. It has been determined that when the alpha-hemihydrate has a surface area of about 2500 to 4000 $cm^2/g$, beneficial properties can be obtained. For samples measured at constant added water, e.g., 44 mL water/100 g plaster (possibly not at the point of their actual water demand), measuring the diameter of a poured patty results in a relationship inversely proportional to the actual water demand. Lab briquettes calcined, crushed, and then ball milled to increasing fineness resulted in higher patty diameter, and therefore reduced water demand. Upon grinding up to about 3500 $cm^2/g$, the patty diameter decreased, resulting in increased water demand (see Table 3 below)

TABLE 3

Pouring Consistency Patty Diameter; Effect of Time in Ball Mill

| Time in Ball Mill (min) | Blaine Surface Area ($cm^2/g$) | Pouring Consistency Patty Diameter (mm) |
| --- | --- | --- |
| 0 | 3113 | 108.5 |
| 15 | 3580 | 120 |
| 30 | 4438 | 119 |
| 60 | 5957 | 115 |
| 120 | | 83.5 |

The impact of the pressure used to make the briquettes on the water demand was studied for two types of gypsum, the Kerr McGee and the LDSG materials. For the LDSG, there was little change in water demand with increased pressure in making briquettes, but the longer calcination time did reduce water demand. If Kerr McGee gypsum is used in place of LDSG, the water demand is reduced from about 43 ml/100 g of plaster to about 37.5 ml/100 g of plaster, as shown in FIG. 12. The test results also showed that at increasing pressure used to make briquettes, the water demand of the resultant ground hemihydrate can be reduced, as shown in FIG. 13. However, at long calcination times (e.g., KMp3 at 150 minutes), the water demand is already reduced and there is little further benefit with increased pressure of briquetting (FIG. 13). The Kerr McGee gypsum is broader in particle size and shape than the LDSG and makes a denser briquette at higher pressure.

Figure 14A:
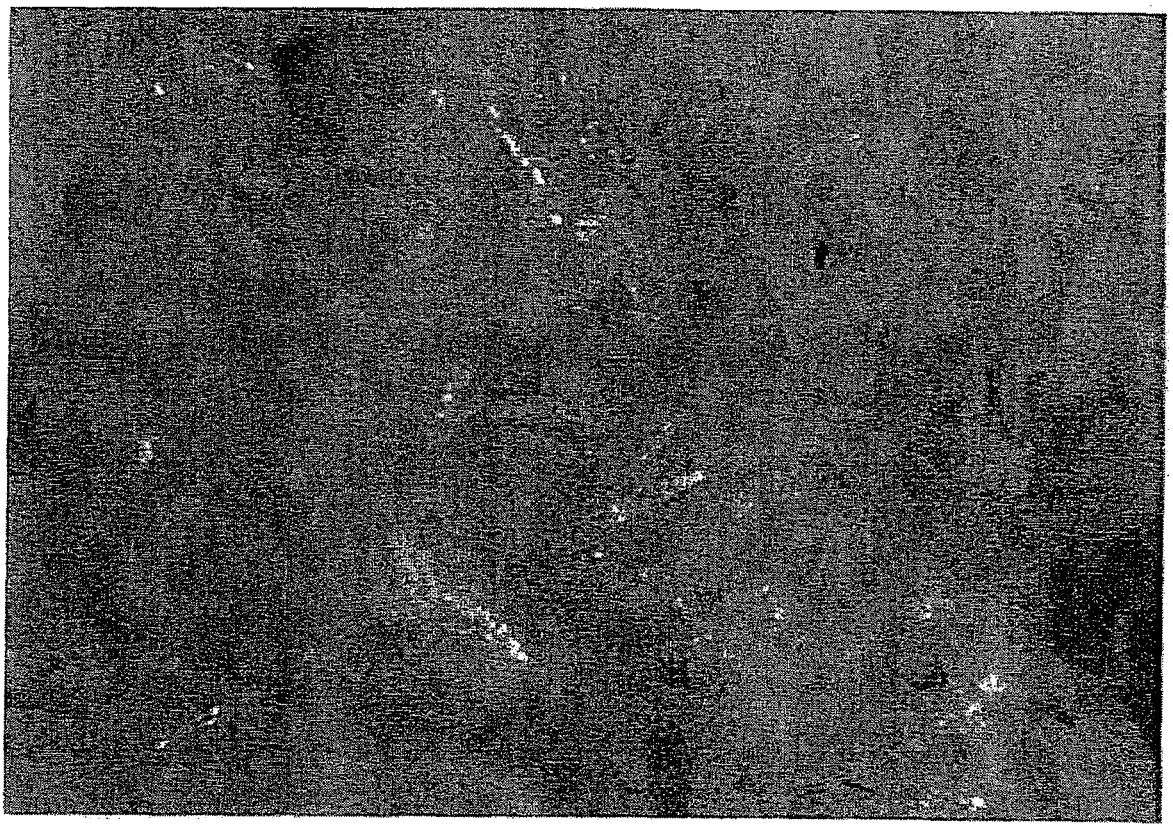
FIG. 14A-14I are microscope photographs illustrating the crystal structures of exemplary hemihydrate products. Note FIG. 14E was taken at a different magnification.
Figure 14B:
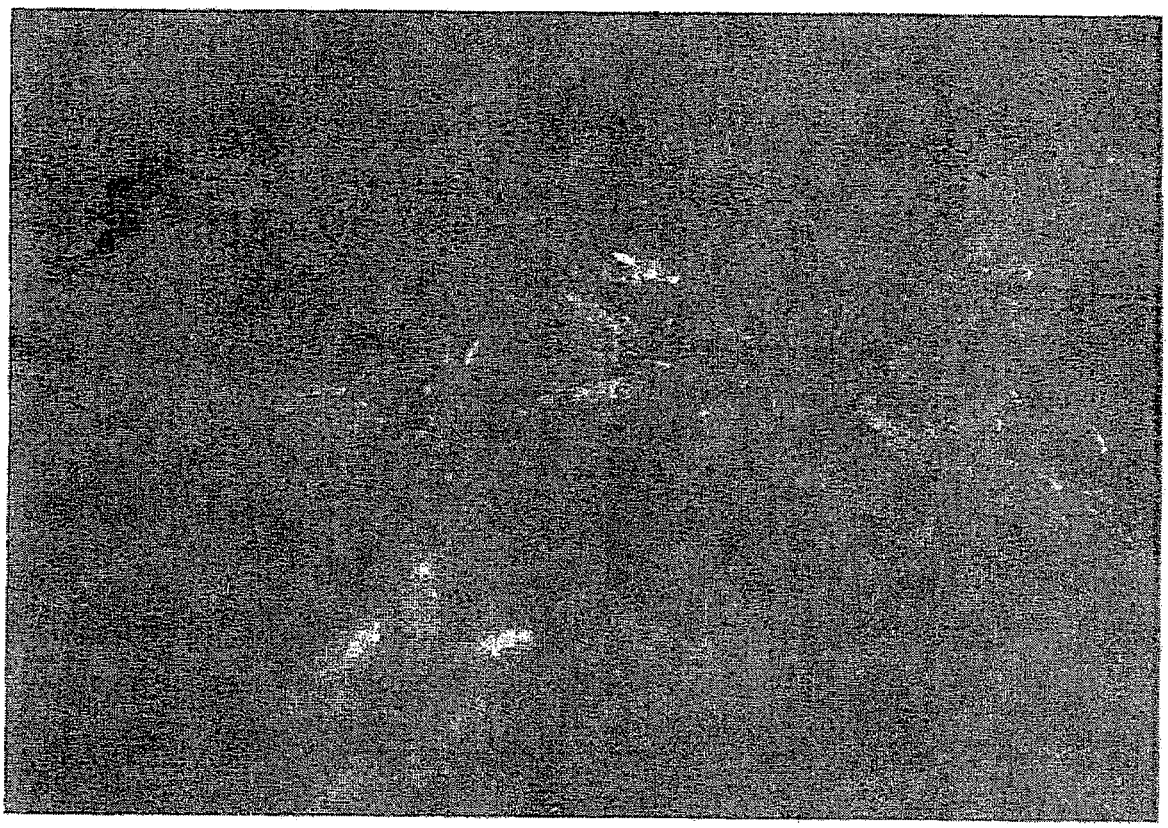
Figure 14C:
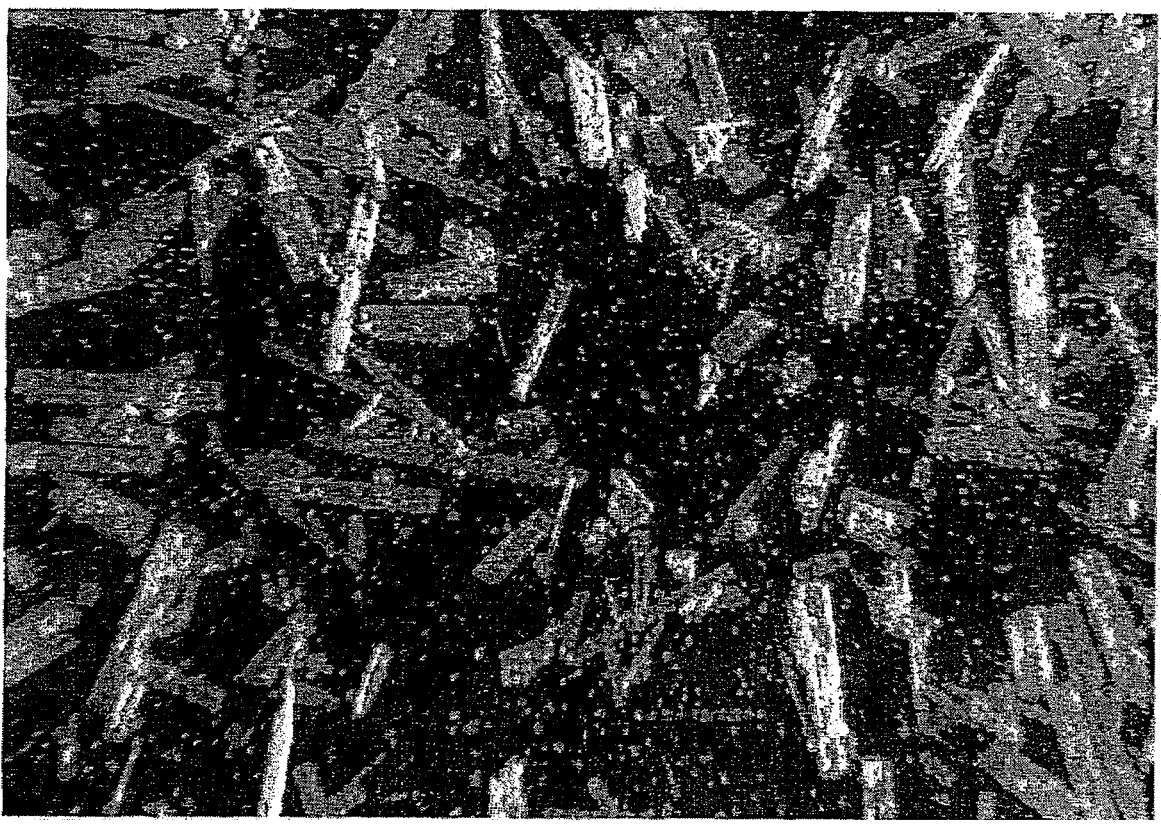
Figure 14D:
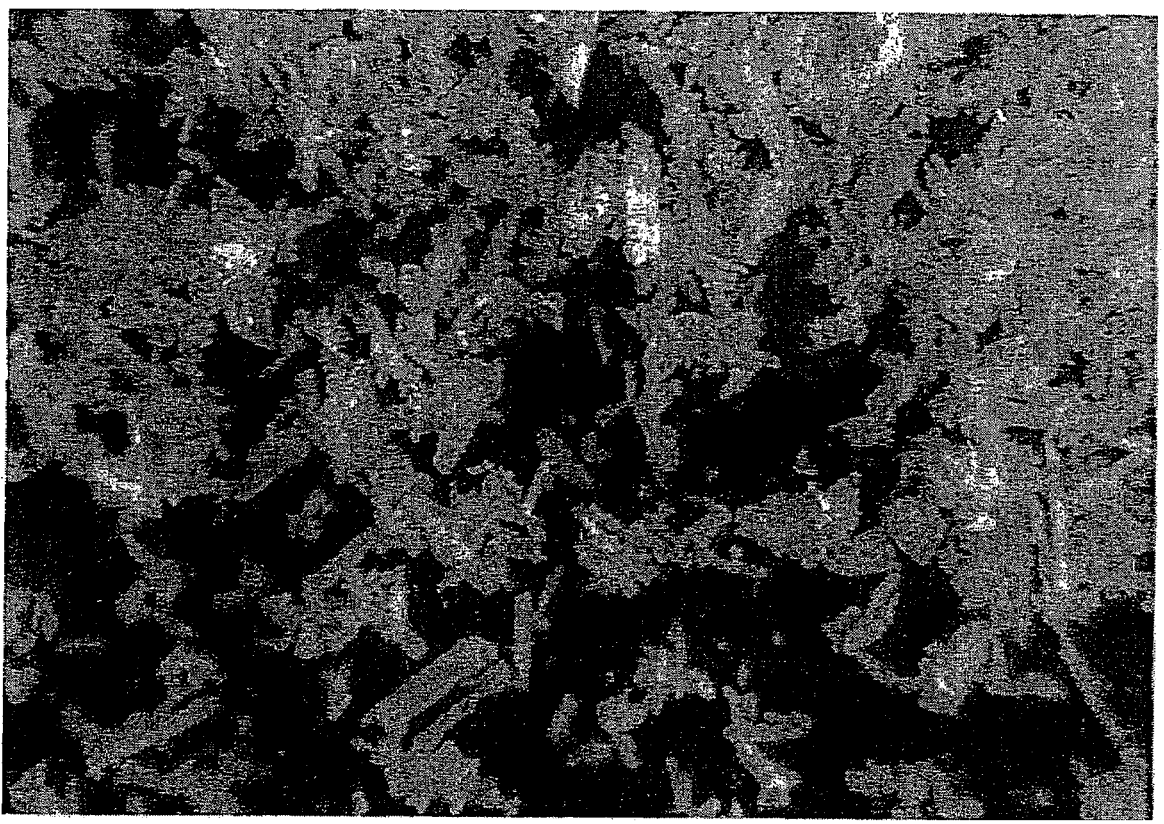

It is useful to examine the photographs of the calcined briquettes to determine the possible cause. The photographs of calcined briquettes made at 14 MPa as given in FIG. 14A show there to be considerable space between the hemihydrate crystals that have grown in the calcined briquettes. At 200 MPa there is much less open space and the crystals of hemihydrate that grow are much more likely to interfere with one another while growing, especially in the fastest-growing long direction of the crystals. The result of this interference is that the crystals end up shorter and thicker than would take place if unrestricted (FIG. 14B). FIG. 14C shows the crystal shape if the KMG is allowed to grow as a powder loosely dispersed in water in the autoclave under the same conditions. For comparison, the same KMG gypsum is also shown in FIG. 14D after having been calcined as a dry powder under the identical conditions. The dry calcination retains the small needle and flake shape of the original gypsum crystals and the loose suspension of hemihydrate grow into long needles, neither of which being ideal to make a low water demand plaster.

Figure 14E:
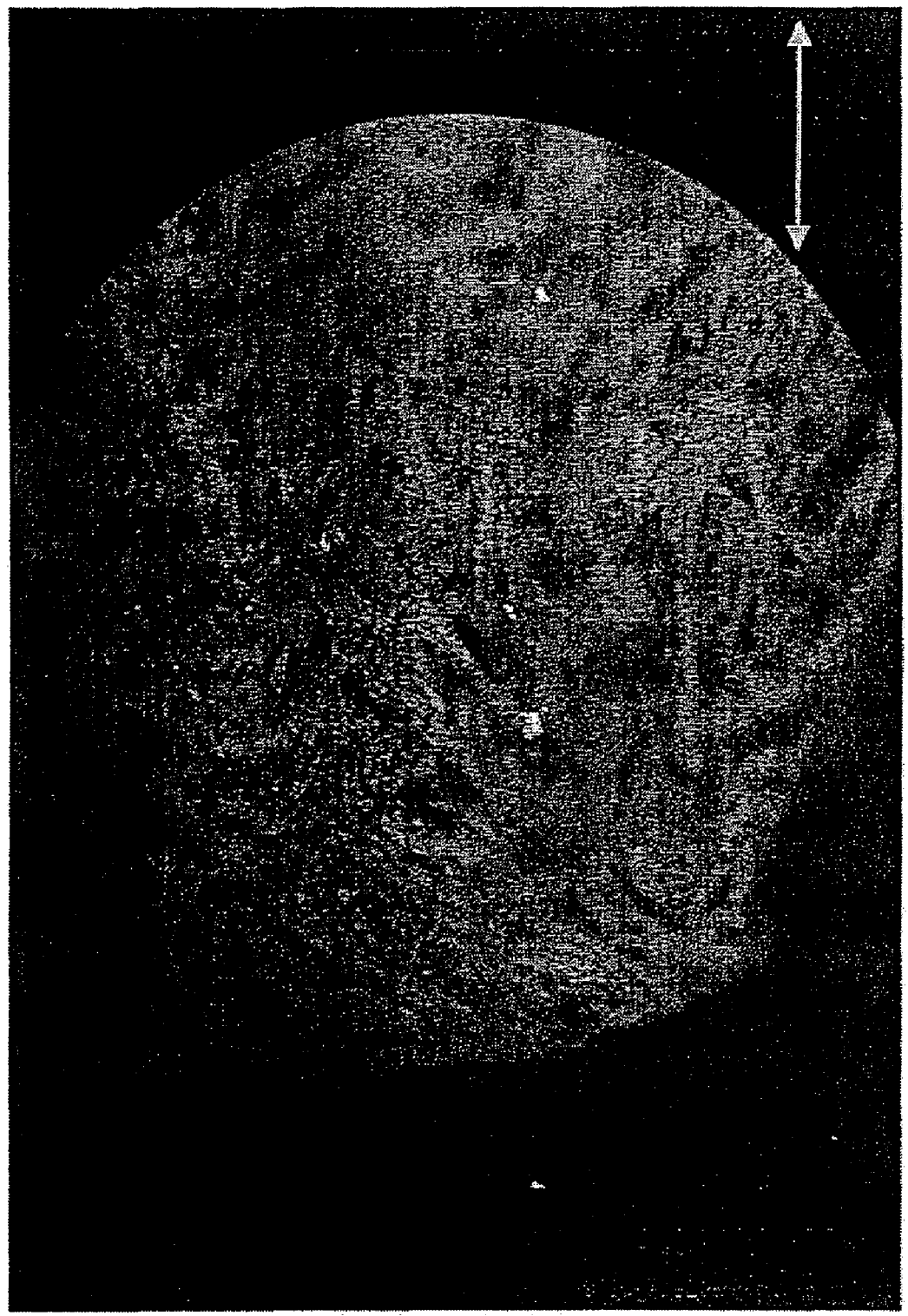

The high pressure of the briquettes and the confined space interferes with the crystal growth to the extent that the hemihydrate crystals that grow from the KMG take the form of the briquette as shown in FIG. 14E. The crystals of alpha-hemihydrate growing in a tightly-packed formation parallel to the surface of the briquette are influenced by the density and orientation of the gypsum crystals from which the alpha hemihydrate was derived. In order to show the macroscopic crystal growth with relation to the surface of the briquette, the photograph of FIG. 14E is taken at a lesser magnification than the others and has a reference distance of 1 mm labeled.

Figure 14F:
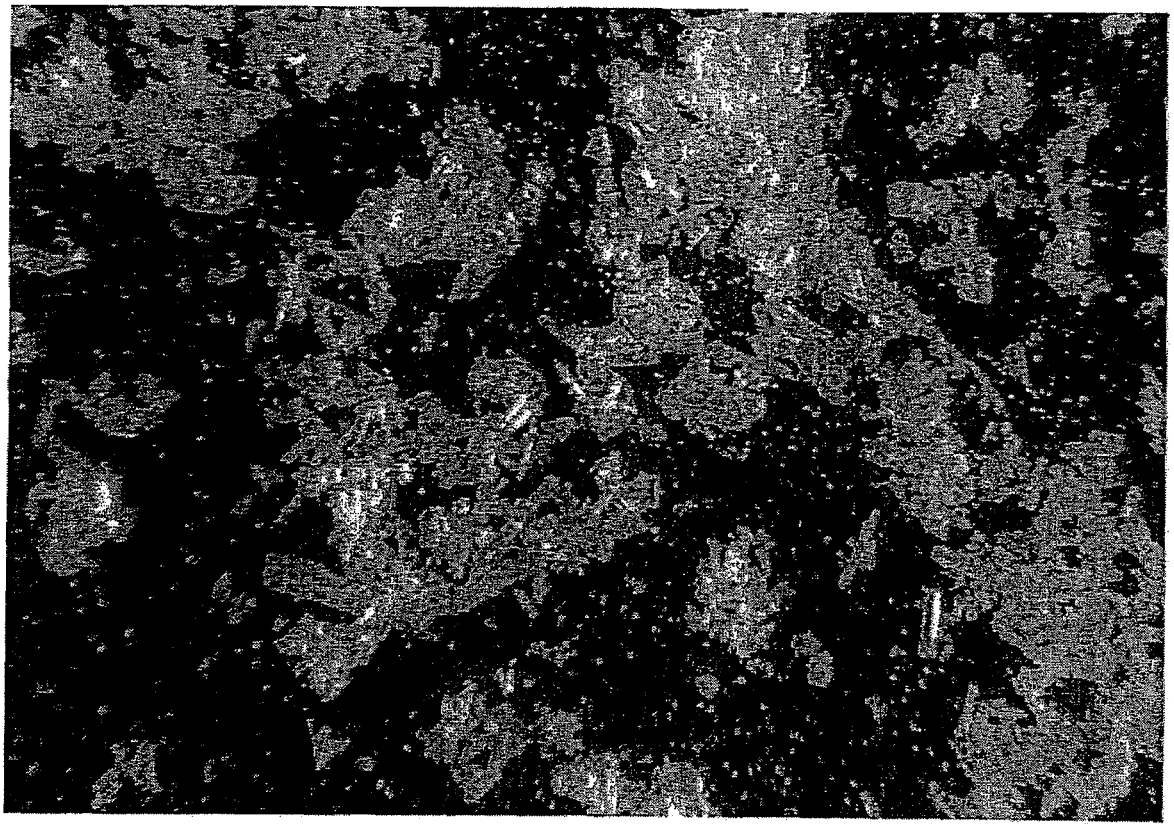
Figure 14G:
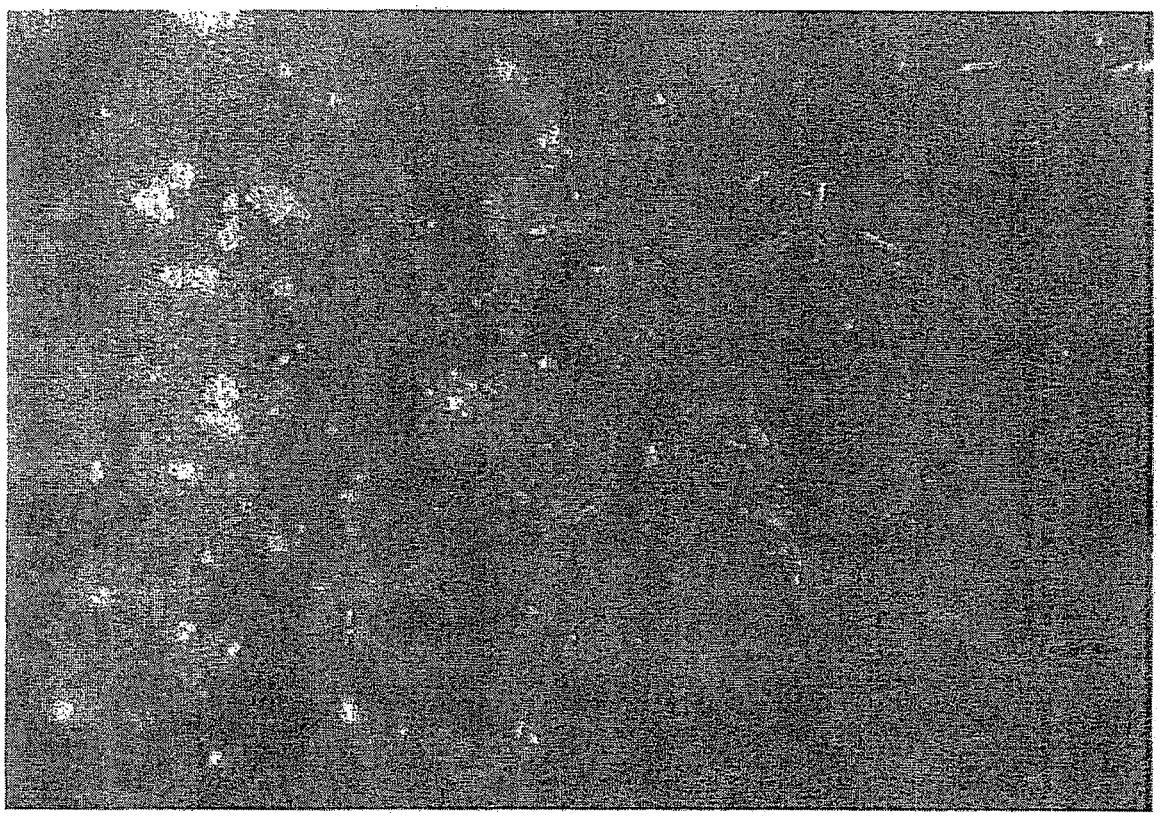
Figure 14H:
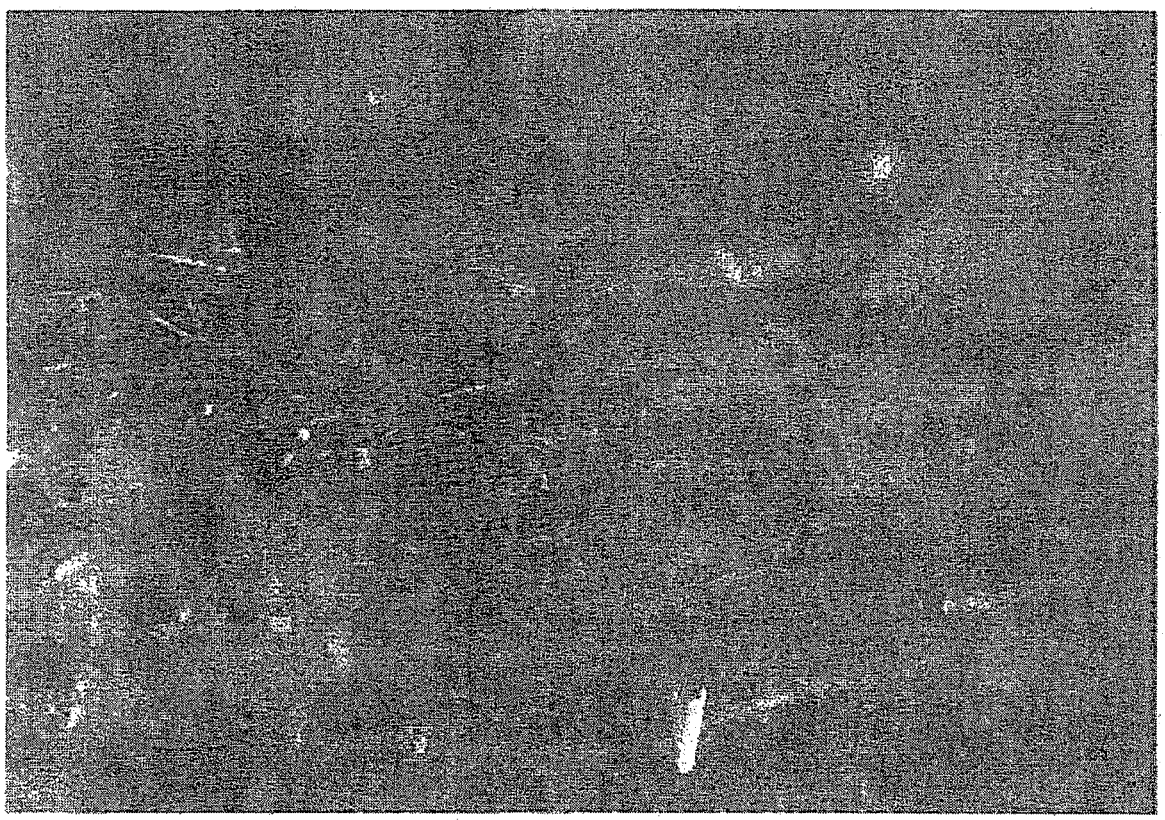
Figure 14I:
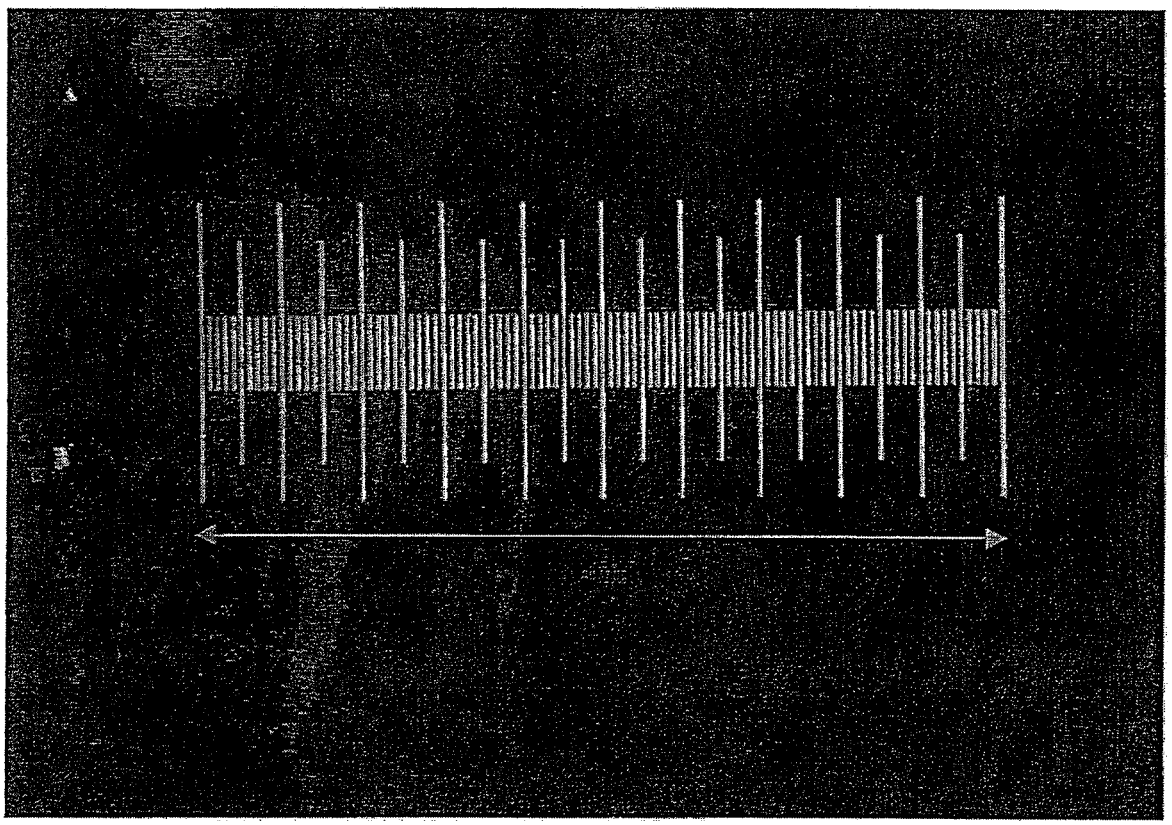

A photograph of the starting KMG is also included for reference (FIG. 14F) to demonstrate that the KMG crystals before calcination are several times smaller than the alpha hemihydrate crystals that result. Calcination of rocks under the same conditions gave different materials, as shown for a sample of pure multi-crystalline Drumbo rock (FIG. 14G) and a single crystal of selenite (FIG. 14H). The calcined Drumbo rock resulted in several smaller crystals well bonded together, while the selenite gave a very ordered structure of long needles, loosely packed together like a stack of pencils easily disturbed when touched. A photograph of a micrometer scale is also included for reference (FIG. 14I) with the distance between the smallest two markings being 10 microns. All FIG. 14 photographs were taken at this magnification, with the exception of FIG. 14E as already noted.

Over the range of water content suitable to make the disclosed briquettes, there is an improvement in water demand with increasing water content in the briquette. FIG. 15 shows that with KMG, the hemihydrate water demand decreased with increasing water content in the briquette. Similarly, calcination for a longer time under these pressurized water vapor conditions further reduces the water demand, highlighting the advantage of having a process that calcines more quickly. Not intending to be bound by theory, higher water content may assist in the heat transfer within the briquette assisting calcination. In addition, water may assist in the hemihydrate crystallization process, thus speeding up calcination rate and reducing water demand. The lower water demand is achieved by growing larger blockier crystals that can give a broad particle size distribution on grinding, which then packs more densely together when mixed with water.

Additives were also found to improve the water demand of the resultant plaster derived from this novel process. The addition of a small amount of sodium succinate resulted in a lower water demand than untreated gypsum under similar calcining conditions, as shown in FIG. 16. Additives such as succinic acid or potassium sulfate are used to modify crystal habit in making alpha hemihydrate in the wet autoclave process. As is shown in FIG. 16, however, in embodiments of the disclosed method, the additive chosen and the amount used is optimized to the process conditions to get the most beneficial result.

The disclosed calcined alpha-hemihydrate briquettes formed under the disclosed high pressures and water contents typically have a pore volume of about 30-50% by volume. In one embodiment, the pore volume of the dihydrate briquette is approximately 40 to 50% by volume. FIG. 17 depicts a bar graph of the pore volume (expressed in Volume %) of various exemplary calcined briquettes, a single crystal of selenite gypsum ("selenite crystal"), and gypsum rock, showing data for both volume of water and volume of air.

It should be pointed out that the overall void percent of the calcined briquettes was not necessarily a simple consequence of the void percentage before calcining. As shown in FIG. 18, comparison of the pore volume of the LDSG briquettes before calcination showed the briquettes at 1% water to be lower in void content than at 3%, yet after calcination the briquettes at 3% showed the lower void percentage. The lower void calcination appears with the conditions that resulted in the lowest water demand.

After calcination, the autoclaved briquettes are usually dried and ground into a fine powder before they are used to make a final powdered alpha-hemihydrate product. Considering the drying characteristics of the briquettes, without intending to be bound by any theory, it appears that the briquettes retain the water lost in calcining within the pores of the briquettes.

FIGS. 19, 20 are graphical presentations of drying data of briquettes. The drying in the laboratory was done using a Precision Mechanical Convection Oven—Model STM 135 (Chicago Ill., USA). Crushing of the briquettes in the lab was done using a hand meat grinder giving particles of size 0-6 mm. Fine grinding in the lab was done using a mortar and pestle. As seen in FIG. 19, the drying time at 104° F. would be about 4-days (~5700 minutes) if dried in a pan, as used in the lab tests for large KM16 briquettes made with 2% water at 211 and 158 MPa respectively. At 194° F. drying is accomplished in about 24 hours (~1500 minutes). For scaled up drying runs, drying time is even longer in an autoclave open to atmosphere. Drying time may be further reduced if the briquettes were placed in open baskets in the autoclave with hot air blown through the briquettes. In one example method, vacuum may also be used in drying to increase the drying rate.

FIG. 20 is a comparison of the drying rates of large unground briquettes with large ground briquettes in another experiment. The ground briquettes were crushed using a hand meat grinder while simultaneously heated with a heat gun. The total crushing time was about five minutes and ~8% of the water was lost during the crushing process. Surprisingly, overall the drying rate of the crushed powder was slower than whole briquettes when placed back in the oven. There was some sample loss during crushing, thus decreasing the size of the crushed bed, which should have theoretically helped it dry faster. Without intending to be bound by any particular theory, this suggests that the rate is faster if there is good circulation of air to dry the material, with this perhaps being a separate factor than the briquette surface area that is exposed. Overall drying time is about 5 to 6 hours for the uncrushed briquettes, and approximately 22 hours for the crushed bed. Lab data was confirmed in pilot plant tests.

As with conventional alpha-hemihydrate, the disclosed improved alpha-hemihydrate can be used in a variety of compositions of matter and products. The water demand of the disclosed alpha-hemihydrate is less than about 50 milliliters (ml) per 100 grams (g), a water demand considered typical for a dry lump autoclave-calcined product. Another exemplary alpha-hemihydrate has a water demand of about 42 mL water per 100 g of alpha-hemihydrate in order to form a type of plaster product. This water demand is sufficient for a variety of applications. The overall range of the water demand possible for the disclosed alpha-hemihydrate is likely 35 to 50 ml/g without additives added to mix, or perhaps 28 to 40 ml/g with crystal habit modifier additives in the alpha-hemihydrate/water mix. For example, the water demand may be from about 32 to 40 ml/g with additives. In another example, the water demand is about 37 to 42 ml/g.

The disclosed alpha-hemihydrate can be used for underground construction including tunnel and gallery digging and for support in subterranean operations. Other examples include a self-leveling floor plaster, a rapid repair paste for rapid setting of a concrete and/or asphalt roof and/or roads, a fiber and/or chip reinforced plate product, a porous foam-like gypsum interwall plate, a porous foam-like adsorbent for use as an oil binder, a solvent binder, an animal litter, and a material for making molds for ceramic purposes. Cost and strength properties of products made from the disclosed improved alpha-hemihydrate suggest that it would be suitable for floors, and indeed offers advantages over the current competitive products and processes. Tests have shown that for the same binder/sand ratio as with competitive products Levelrock™ 2500 (manufactured by and commercially available from USG of Chicago, Ill., USA) there is improvement at equal fluidity and water content. See Table 4 below.

TABLE 4

Strength data of Exemplary Disclosed Alpha-Hemihydrate Compared with Levelrock ™ 2500

| Hemihydrate Material | Mass of Hemihydrate (g) | Mass of Sand (g) | Mass of Water (g) | Mass of Cube (g) | Compressible Strength (psi) |
|---|---|---|---|---|---|
| Levelrock ™ 2500 | 343 | 1157 | 357.6 | 224.0 | 819 |
| Levelrock ™ 2500 | 399 | 1098 | 321.6 | 234.2 | 1534 |
| Exemplary Disclosed Alpha-Hemihydrate | 343 | 1157 | 357.6 | 236.2 | 1131 |
| Exemplary Disclosed Alpha-Hemihydrate | 343 | 1157 | 357.6 | 226.0 | 1007 |
| Exemplary Disclosed Alpha-Hemihydrate | 399 | 1098 | 321.6 | 219.1 | 1729 |

As can be seen from the data in Table 4, at comparable cube weights, the disclosed alpha-hemihydrate yields a floor leveling product with higher compressive strength than that of a commercially-available product presumably made from a conventional alpha-hemihydrate. Additionally, because the disclosed alpha-hemihydrate is made significantly faster and more cheaply, the disclosed improved alpha-hemihydrate can be used in other applications that were heretofore cost-prohibitive.

Additives can be incorporated for immediate and rapid setting of building material made with the alpha hemi-hydrate. Sand is one possible additive to the alpha-hemihydrate that is traditionally incorporated into the compositions of matter, for example a self-leveling floor plaster. An alternative embodiment of the disclosed gypsum-based compositions of matter replaces at least some of the sand with fly ash to reduce the water demand of the improved alpha-hemihydrate and increase the strength of the products made with the improved alpha-hemihydrate. Water demand of the poured binder-aggregate mix can be significantly reduced by the replacement of some (about 0-30%) of the sand aggregate with fly ash.

As shown in FIG. 21, replacing at least some sand with fly ash, but keeping the water content constant, marginally increases the compressive strength of the set disclosed dried and ground alpha-hemihydrate. A more significant increase in compressive strength can be observed when the water is subsequently reduced on the same sample with fly ash to account for the new reduced water demand. This increase in strength of the product occurs even with fly ash addition in very low amounts.

Particle size data of FIGS. 22A and 22B show the particle size and shape distribution data of two different types of raw gypsum. FIGS. 23A-23C show the same data for the same starting raw material as in FIGS. 22A and 22B, after the raw gypsum has been subjected to exemplary processes disclosed herein. The particle size distribution data show the disclosed dried/ground material to be more bimodal in size distribution than the conventional dry lump calcined/ground product. A broad and even distribution of particle size optimizes the water demand of the alpha-hemihydrate. Without intending to be bound to any theory, it is believed that addition of fly ash may even out the particle size distribution of the entire mix (e.g., binder, fly ash, and sand), thus further improving the water demand of the powdered alpha-hemihydrate.

It should be emphasized that the above-described embodiments of the improved alpha calcium sulfate hemihydrate, methods of making alpha calcium sulfate hemihydrate, and products made with the improved alpha calcium sulfate hemihydrate are merely possible example implementations. Many variations and modifications may be made to the above-described embodiment(s). All such modifications and variations are intended to be included herein within the scope of this disclosure and the following claims.

Therefore, having thus described the invention, at least the following is claimed:

1. A ground alpha-hemihydrate made from a process comprising
   forming calcium sulfate dihydrate into a briquette having physically bound water in a range from about 15% to 21% by weight of the calcium sulfate dihydrate briquette, wherein forming calcium sulfate dihydrate into a briquette includes providing a pressure of formation greater than 14 megapascal to produce a substantially uncracked briquette that will remain substantially uncracked during calcination;
   adding free water to the calcium sulfate dihydrate briquette, wherein the free water is just greater than 0% up to about 12% by weight of the calcium sulfate dihydrate briquette;
   calcining the briquette;
   transforming the calcium sulfate dihydrate briquette to an alpha calcium sulfate hemihydrate briquette; and
   drying the alpha calcium sulfate hemihydrate briquette.

2. A product produced from a mixture comprising:
   ground alpha-calcium sulfate hemihydrate made from the process of claim 1 and water.

3. The product of claim 2, further comprising at least one of sand and fly ash.

4. An alpha calcium sulfate hemihydrate of claim 1 comprising:
   crystals of the alpha-calcium sulfate hemihydrate that have grown together to form clusters of the crystals;
   wherein the clusters of the crystals of alpha calcium sulfate hemihydrate have a smaller amount of pore volume between the clusters, when compared to the pore volume of alpha calcium sulfate hemihydrate crystals formed from dihydrate briquettes with about 0% to 12% moisture concentration.

5. The alpha calcium sulfate hemihydrate of claim 4, wherein the clusters of crystals may be ground to produce blocky crystals of alpha-hemihydrate.

6. The alpha calcium sulfate hemihydrate of claim 5, wherein the ground alpha-hemihydrate has a bimodal particle size distribution.

7. The alpha calcium sulfate hemihydrate of claim 4, wherein the substantially reduced pore volume comprises a pore volume of about 30 to 50% of the volume of the crystals.

8. The alpha calcium sulfate hemihydrate of claim 4, wherein the reduced pore volume comprises a pore volume of about 40 to 50% of the volume of the crystals.

9. A dry, ground alpha calcium sulfate hemihydrate of claim 1 converted from a calcined calcium sulfate dihydrate briquette; wherein the dry, ground alpha calcium sulfate hemihydrate has a water demand of less than 50 milliliters per 100 grams of dry, ground alpha calcium sulfate hemihydrate.

10. The alpha calcium sulfate hemihydrate of claim 9, wherein the alpha calcium sulfate hemihydrate is formed from gypsum obtained as a byproduct from at least one of the following processes: desulfurization of flue gases, production of titanium dioxide, or production of phosphate fertilizers.

11. The alpha hemihydrate of claim 1, wherein the pressure used to form the calcium sulfate dihydrate briquette ranges from about 100 to 200 MPa.

* * * * *